United States Patent [19]

Rappas

[11] Patent Number: 4,545,816
[45] Date of Patent: Oct. 8, 1985

[54] PROCESSES RELATING TO THE EXTRACTION OF METALS FROM LATERITES AND OCEAN MANGANESE NODULES

[75] Inventor: Alkis S. Rappas, Chagrin Falls, Ohio

[73] Assignee: The Standard Oil Co., Cleveland, Ohio

[21] Appl. No.: 616,841

[22] Filed: Jun. 4, 1984

[51] Int. Cl.$^4$ .................. C22B 23/04; C22B 15/08
[52] U.S. Cl. ................. 75/101 R; 75/101 BE; 75/108; 75/114; 75/117; 75/119; 75/121; 423/24; 423/27; 423/38; 423/46; 423/49; 423/139; 423/141; 423/150; 423/DIG. 4; 204/106; 204/107; 204/105 M; 204/113
[58] Field of Search ............ 423/141, 49, 150, 38, 423/27, 46, DIG. 4, 24, 139, 9; 75/101 R, 101 BE, 108, 114, 117, 119; 204/106, 105 M, 107, 113

[56] References Cited

U.S. PATENT DOCUMENTS

| | | | |
|---|---|---|---|
| 3,761,566 | 9/1970 | Michal | 423/141 |
| 3,820,979 | 6/1974 | Manassen | 75/108 |
| 3,865,744 | 2/1975 | Parker et al. | 252/188.3 R |
| 3,983,017 | 9/1976 | Szabo | 204/106 |
| 3,988,416 | 10/1976 | Barner et al. | 423/DIG. 4 |
| 4,032,331 | 6/1977 | Gerlach | 75/108 |
| 4,032,332 | 6/1977 | Gerlach | 75/108 |
| 4,033,765 | 7/1977 | Gerlach | 75/108 |
| 4,038,070 | 7/1977 | Rappas et al. | 75/108 |
| 4,044,096 | 8/1977 | Queneau et al. | 423/150 |
| 4,085,188 | 4/1978 | Subramanian et al. | 423/32 |
| 4,095,975 | 6/1978 | Rappas et al. | 75/108 |
| 4,107,262 | 8/1978 | Lueders et al. | 423/DIG. 4 |

Primary Examiner—John Doll
Assistant Examiner—Robert L. Stoll

[57] ABSTRACT

The selective leaching of metal ions from various iron oxide and manganese oxide containing ores employs intermediary solutions. The leaching processes are based upon a redox acid leach step employing stabilized cuprous ions and, in one instance, a combination thereof with ferrous ions. Leaching is conducted at low temperatures, up to about 90° C. and low pressures, up to about 1.5 MPa and at a pH of about 1.5 to 2.5. Nickel and cobalt recoveries from the ores, employing these processes, will usually equal or exceed 90 percent. The intermediary solutions comprise stabilized acidic cuprous ions $Cu+L$ wherein L is a stabilizing ligand selected from the group consisting of CO, XRCN and $Cl^-$, X being —H or —OH and R being aliphatic having from one to about four carbon atoms. In at least one process, ferrous ions are introduced for a separate leaching step. Additional steps include regeneration of the lixiviant cuprous ion solutions and removing a portion of the copper ions from the copper ion solution before or after the step of regenerating. Several processes for the regeneration are possible employing quinolic compounds, $H_2$, CO or syngas as reductants.

61 Claims, 9 Drawing Figures

PROCESSES RELATING TO THE EXTRACTION OF METALS FROM LATERITES AND OCEAN MANGANESE NODULES

TECHNICAL FIELD

The processes of the present invention are intended for the treatment of certain ores, generally considered lower grade, as a result of which certain desirable metals can be extracted. One major source of these ores includes the terrestrial oxide type nickel ores or laterites, so named because they result from a process known as laterization whereby ultramafic magma undergoes prolonged and continuous decomposition and weathering.

After intense oxidation, differential leachings and precipitations and differential dissolution of magnesia and silica from the ultramafic rock, the residual surface layers of the deposit become enriched in nickel, cobalt, iron, chromium, manganese and aluminum. Further enrichment in nickel occurs in the underlying layers. As is known, a lateritic deposit, somewhat idealized, is characterized by a vertical composition profile with a hematitic cap or over-burden under which lies nickeliferous Limonite, followed by altered Peridotite and finally unaltered Peridotite.

As a general rule, cobalt, iron and manganese concentrations are higher in the upper regions of the vertical profile and decrease with depth. Similarly, nickel, magnesium and silica concentrations become greater as the depth increases. The Limonitic ore is particularly suited for treatment by the processes of the present invention. It typically comprises a high iron phase, goethite (alpha-FeOOH) and a lower amount of manganese oxide. The goethite contains a high fraction of the total nickel content, e.g., 75 to 95 percent of the nickel and low fraction of the total cobalt content, e.g., 0 to 20 percent of the cobalt. The manganese oxide phase is roughly reversed with a high cobalt content, e.g., 80 to 100 percent of the cobalt and a lower nickel content, e.g., 5 to 15 percent of the nickel. The overall result is that Limonitic ores provide a higher amount of nickel than cobalt.

Manganese ocean or sea nodules offer a composition generally opposite that of the Limonitic ores, that is, having a greater manganese oxide content than iron oxide content. Composition of the manganese nodules is analogous to what has been observed for the limonitic ores and that is a variance depending upon location in the ocean. Inasmuch as manganese nodules form in oxidizing environments, cations with higher valencies predominate over reduced valence states.

In order to access and extract, the nickel and cobalt, the ore matrix must be treated chemically, that is, converted or solubilized. Commonly, this can be achieved by reducing Fe(III) to Fe(II) or Fe° and $MnO_2$ to Mn(II). Thermodynamically, such reductions are possible by carbon monoxide or hydrogen in acidic or alkaline solutions. However, kinetically, such reductions do not occur under reasonable temperature and pressure unless a catalyst is provided.

Both laterites and manganese ocean nodules will be important as a future source for nickel an cobalt. The present invention is directed toward treatment of these and like ores which are generally considered to be low grade as well as not being amenable to conventional beneficiation techniques, e.g., nickel and cobalt content is too low for an economically feasible recovery. However, given high enough recoveries, such as greater than 90 percent, and low energy requirements, e.g., temperature at or near 30° to 60° C. and pressure between 1 to 10 atmospheres, the processes set forth herein are economically feasible. An important process of the present invention shall be referred to herein as the ARIS process for Ambient Reduction by Intermediary Solutions.

BACKGROUND ART

A variety of methods are known for the recovery of nickel and cobalt from lateritic ores. One method, known as the high pressure sulfuric acid leaching process, e.g., the Moa Bay process, is practiced by pulping the ore to specific mesh and solids and then selectively leaching the nickel and cobalt with sulfuric acid at elevated temperature and pressure. After proper washing and pH adjustment, the leached pulp is subjected to sulfide precipitation at elevated temperature and pressure to obtain the nickel and cobalt but not without oxidation, additional pH adjustment and selective recovery steps are performed.

The foregoing process is discussed in greater detail in a U.S. patent owned by AMAX, Inc., No. 4,044,096, which also employs a high pressure sulfuric acid leaching step of laterites at elevated temperature. The ore is first slurried and autoclaved, leached with acid and subsequently discharged into a flash tank to create turbulence.

U.S. Pat. No. 3,761,566 provides another method for leaching lateritic ores. Leaching is conducted at elevated temperature and pressure with waste solutions of ferrous sulfate.

Similarly, processes are known for the recovery of nickel and cobalt from manganese sea nodules. U.S. Pat. No. 4,085,188 provides a reductive leaching of sea nodules in an aqueous ammoniacal medium and with a reducing agent such as $SO_2$, sulfides, $NO_2$ or metallic iron. Manganese is reduced from its tetravalent state to manganous carbonate and, nickel, cobalt and copper are extracted.

U.S. Pat. No. 3,983,017 provides for the recovery of copper, nickel, cobalt and molybdenum from sea nodules by leaching with an aqueous ammoniacal solution containing cuprous ions. Carbon monoxide is employed as a reductant for cupric ions in order to regenerate cuprous ions for the initial leaching step.

Once metals have been solubilized they must be removed from solution in order to complete the recovery process. Recovery preferably does not consume costly materials nor does it provide useless or waste by-products. One process for the recovery of copper, silver and mercury is described in U.S. Pat. No. 3,820,979 which calls for contacting an aqueous solution of the metal with a solution of a quinonic compound in an organic solvent. After the metal precipitates and is separated, the organic phase is separated and the quinonic compound is optionally reduced for subsequent use.

Another process for the recovery of copper from acidic solutions is set forth in my U.S. Pat. No. 4,038,070 which provides for reduction of cupric ions to cuprous ions with hydrogen in the presence of a cuprous stabilizing ligand such as acetonitrile to produce cuprous-nitrile complexes that can be disproportionated to produce copper metal and cupric ions.

A similar process which employs a quinolic reductant is described in my U.S. Pat. No. 4,095,975 which also provides for the recovery of copper from acidic solutions. The copper solution is initially contacted with a quinolic reductant and an aqueous nitrile-solubilized in a water immiscible solvent to produce a nitrile stabilized cuprous solution and an organic solution of the oxidized quinolic compound. By driving off the nitrile, the cuprous ions disproportionate, producing equimolar quantities of copper metal and cupric ions. The quinolic compound can be reduced by hydrogen gas.

Notwithstanding the disclosures of the foregoing art, more economic processes for the selective extraction of desired metals such as nickel and cobalt have not appeared heretofore. Such processes should be characterized by low temperature and low pressure parameters and almost quantitative recoveries. By-products are desirably neither harmful nor costly to generate or dispose. Recycling adds to the economy and is desirably accomplished without resort to expensive reactants or processing conditions. Again, the body of art known to me has not met all of these requirements.

DISCLOSURE OF THE INVENTION

The present invention provides several processes employing various combinations of steps that either allow selective leaching of metal ions from various ores with intermediary solutions or the generation of such solutions. The leaching processes are based upon an acid leach step employing stabilized cuprous ions and, in one instance, a combination thereof with ferrous ions. Leaching is conducted at low temperatures under 90° C. and low pressures, under 1.4 MPa and at a pH of about 1.5 to 2.5.

A variety of ores can be treated as will be discussed hereinbelow in greater detail. Such ores basically comprise iron oxide and manganese oxide ores which provide nickel and cobalt, respectively. Nickel and cobalt recoveries from the ores, employing these processes, will usually equal or exceed 90 percent. The intermediary solutions employed produce no by-products harmful to the environment such as $SO_2$, $H_2S$, NO and the like. Generally the final waste materials will be inert and directly suitable for landfills.

In general, one process for the extraction of ferrous, manganous and nonferrous metals from iron oxide and manganese oxide containing ores by reduction leaching comprises the steps of contacting the pulverized ore with a stabilized acidic cuprous ion solution $Cu+L$ at a temperature of up to about 65° C. while maintaining the pH between about 1.5 and 2.5 with acid to form a slurry, wherein L is a stabilizing ligand selected from the group consisting of CO, XRCN and $Cl^-$, X being —H or —OH and R being aliphatic having from one to about four carbon atoms; separating the slurry into a solid tailings portion and a pregnant liquor, the pregnant liquor containing solubilized ferrous, manganous, cupric and other nonferrous metal ions; selectively extracting the solubilized metal ions and, regenerating the cuprous ion solution from the solubilized cupric ions and the ligand, L, in the presence of a reductant.

Additional steps of the first process include removing a portion of the cuprous ions from the cuprous ion solution after the step of regenerating by drawing off a slipstream of the stabilized cuprous ion solution, allowing the slipstream to disproportionate, forming free copper metal and cupric ions and, separating the copper metal from the cupric ions.

Alternatively, a portion of the cupric ions can be removed from the cupric ion solution before the step of regenerating by combining the solubilized cupric ions with a quinolic compound selected from the group consisting of quinol and anthraquinols to form a three phase slurry consisting essentially of free copper metal, an aqueous acid phase and the corresponding quinonic compound and, separating the copper metal therefrom.

A second major process of the present invention also provides for the extraction of ferrous, manganous and nonferrous metals from iron oxide and manganese oxide containing ores by reduction leaching and comprises the steps of contacting the pulverized ore with a stabilized acidic cuprous ion solution $Cu+L$ at a temperature of up to about 65° C. while maintaining the pH between about 1.5 and 2.5 with acid to form a slurry, wherein L is a stabilizing ligand selected from the group consisting of CO, XRCN and $Cl^-$, X being —H or —OH and R being aliphatic having from one to about four carbon atoms; separating the slurry into a solid tailings portion and a pregnant liquor, the pregnant liquor containing solubilized ferrous, manganous, cupric and other nonferrous metal ions and, selectively extracting the solubilized metal ions.

Another process provided by the present invention can be employed for the regeneration of stabilized cuprous ion solutions, usable as reductants, from acidic cupric ion solutions. It comprises the steps of combining the solubilized cupric ions with CO as a stabilizing ligand and a quinolic compound selected from the group consisting of quinol, anthraquinols and naphthoquinols at a pressure of from about 0.10 to about 1.4 MPa and at a temperature of from about 20° to 90° C. to form an aqueous $CuCO^+$ lixiviant and the corresponding quinonic compound, separating the lixiviant from the quinonic compound and, regenerating the quinolic compound from the quinonic.

Another process for the regeneration of stabilized cuprous ion solutions from acidic cupric ion solutions comprises the steps of dividing the cupric ion solution into first and second streams, combining the first stream with a quinolic compound selected from the group consisting of quinol and anthraquinols to form a three phase slurry consisting essentially of free copper metal, an aqueous acid phase and the corresponding quinonic compound, separating the quinonic compound from the copper metal and aqueous acid and, cooling and combining the second stream with the copper metal and aqueous acid and with a stabilizing ligand L, where L is CO or XRCN, whereby the stabilized cuprous ion solution, $Cu+L$ is formed.

Yet another process for the regeneration of stabilized cuprous ion solutions from acidic cupric ion solutions comprises the steps of reducing the solubilized cupric ions with CO to form a slurry comprising copper metal, cupric ions and acid and, combining the slurry with a stabilizing ligand L, where L is CO or XRCN, to form the stabilized ion solution $Cu+L$.

Still another process for the regeneration of stabilized cuprous ion solutions from acidic cupric ion solutions comprises the steps of reducing the solubilized cupric ions with syngas in an autoclave operating at a pressure of between about 0.5 and 5.0 MPa and at a temperature of from about 150° to 260° C. to form a slurry comprising copper metal, cupric ions and acid and, combining the slurry after cooling to below 90° C. with a stabilizing ligand L, where L is CO or XRCN, to form the stabilized ion solution $Cu+L$.

Any of the foregoing individual processes for regeneration of the stabilized cuprous ion solutions can be employed in conjunction with the two extraction processes presented hereinabove. Insofar as those processes are concerned, yet another manner for the regeneration, where L is XRCN, includes the steps of combining the solubilized cupric ions with the ligand XRCN and a quinolic compound selected from the group consisting of quinol, anthraquinols and naphthoquinols at a pressure of from about 0.1 to about 0.2 MPa and at a temperature of from about 20° to 65° C. to form a CuXRCN lixiviant and the corresponding quinonic compound, separating the lixiviant from the quinonic compound and, regenerating the quinolic compound from the quinonic.

Still another process for the regeneration, in conjunction with the extraction processes, includes the steps of reducing the solubilized cupric ions with hydrogen to form a slurry comprising copper metal, cupric ions and acid and, combining the slurry with the ligand L, where L is CO or XRCN, to form the stabilized ion solution $Cu^+L$.

A separate process for the extraction of ferrous, manganous and nonferrous metals from iron oxide and manganese oxide containing ores by reduction leaching is provided which comprises the steps of contacting the pulverized ore with a stabilized acidic cuprous ion solution $Cu^+L$ at a temperature of up to about 65° C. while maintaining the pH between about 1.5 and 2.5 with acid to form a slurry, wherein L is a stabilizing ligand selected from the group consisting of CO, XRCN and $Cl^-$, X being —H or —OH and R being aliphatic having from one to about four carbon atoms; separating the slurry into a solid tailings portion and a pregnant liquor, the pregnant liquor containing solubilized ferrous, manganous, cupric and other nonferrous metal ions; feeding the pregnant liquor to a second pulverized ore feed, containing, at least partially, manganese oxide ore to form a second slurry; separating the second slurry into a solid tailings portion containing substantially unsolubilized iron oxide ore and a second pregnant liquor containing solubilized ferrous, manganous, cupric and other nonferrous ions and, selectively extracting the solubilized metal ions.

Finally, a process for the selective extraction of manganous and nonferrous metals from iron oxide containing ores by reduction leaching is provided which comprises the steps of contacting the pulverized ore with an acidic $Fe^{2+}$ solution in a suitable reaction at a temperature of up to about 90° C. while maintaining the pH between about 1.5 and 2.5 with acid to form a slurry, separating the slurry into a solid tailings portion and a pregnant liquor, the pregnant liquor containing solubilized ferric, manganous, cupric and other nonferrous metal ions and, selectively extracting the solubilized metal ions.

BRIEF DESCRIPTION OF THE DRAWINGS

FIG. 9 is a schematic diagram depicting another process for the reduction of ores.

PREFERRED MODE FOR CARRYING OUT THE INVENTION

Figure 1:
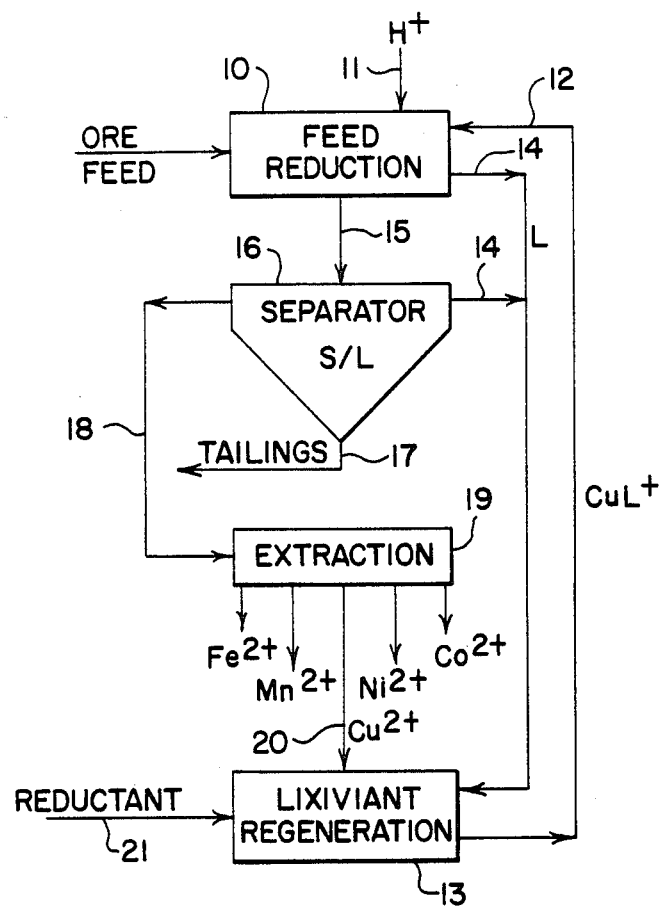
FIG. 1 is a schematic diagram illustrating a major overall process of the present invention, the ARIS process.

Practice of the present invention leaches or dissolves the Goethite phase, $Fe^{3+}OOH$ and $Mn^{4+}O_2$ phase in laterites and similar iron ores to provide $Ni^{2+}$ and $Co^{2+}$ by reducing the iron and manganese to $Fe^{2+}$ and $M^{2+}$ states. The process wil also accomodate manganese sea nodules as the feed ore to reduce manganese and iron to 2+ states and provide $Ni^{2+}$ and $Co^{2+}$ for subsequent separation and recovery. The various processes employ a $Cu^+$/ligand (L) reductant and include steps for the regeneration thereof.

Before proceeding with the details of the processes, a brief discussion of the two ores particularly suited for treatment thereby shall be provided. First, regarding the laterites, the limonitic or high iron type is preferred. Other ores, having a relatively high Mg and Si content, could pose process problems such as acid consumption and large quantities of magnesium by-products. A typical chemical composition by weight percent for limonitic ore appears in Table I.

As to the manganese sea nodules, any type can be treated by the process of the present invention irrespective of the ocean, depth, or the environment, e.g., seamount, ridges, continental borderlands and the like. An average chemical composition (partial), by weight percent, for sea nodules also appears in Table I.

TABLE I

| Partial Chemical Composition of Feed Materials | | |
|---|---|---|
| Elements | Laterites[a] | Mn nodules[b] |
| Ni | 1.20 | 0.491 |
| Fe | 33.20 | 15.61 |
| Co | 0.15 | 0.30 |
| Mn | 0.48 | 16.17 |
| Cr | 1.67 | 0.001 |
| Mg | 7.25 | 1.82 |
| Al | 1.73 | 3.10 |
| Si | 8.93 | 8.62 |
| Cu | 0.01 | 0.26 |

[a]U.S. Bureau of Mines analysis of Gasquet Mountain Laterites
[b]Marine Manganese Deposits, G. P. Glasby ed., Elsevier Oceanographic Series, (1977).

The remainder of the ores will consist of various oxides, clay, minerals and the like many of which are neither useful nor necessarily recoverable by the process of the present invention. It is to be understood that as the iron, manganese, nickel and cobalt are selectively leached, the waste material or tailings become enriched in the unleached materials. Some, such as chromium, are not substantially removed by the present invention and therefore their recovery by alternative means from the tailings may be economically feasible, given the greater concentration therein.

The ARIS process constitutes a preferred mode of the present invention and is characterized by being a low temperature, low pressure acid leach process. Leaching of the $Fe_2O_3$ and $MnO_2$ ore components in acidic aqueous solutions with the stabilized cuprous ions results in the accessibility of cobalt, nickel and copper with minimal leaching of chromium, magnesium and precious metals other than silver. The cuprous ions in the leach solution are stabilized against disproportionation with a ligand L such as $CH_3CN$, CO or Cl to form a complex. During the leaching step the cuprous ions are oxidized to cupric which can be recycled and regenerated as cuprous in several additional steps.

As noted hereinabove, the process is adapted for treatment of high iron-containing (limonitic) laterites, which can contain some manganese, and manganese sea nodules, which also contain some iron. These iron and manganese ores contain non-ferrous metals such as nickel, cobalt and copper which can be extracted in nearly quantitative yields.

Although particle size is not critical to practice of the present invention, it is generally understood in the art that a large surface area greatly reduces the reaction time and, therefore, the ore, terrestrial or sea nodule, is ground and milled by any suitable means to reduce the size to about −100 mesh.

The ore is first subjected to a redox leach step which occurs at a pH of from about 1.5 to 2.5 and preferably less than about 2. Non-oxidizing acids are employed such as sulfuric, hydrochloric and the like with sulfuric being preferred. The leaching step should be monitored as to pH and additional acid provided on demand in order to maintain a steady and low pH.

The reducing agent for this step is the cuprous ion. Inasmuch as it is not stable in acid medium, it is complexed with a recyclable ligand such as $CH_3CN$ or CO. While both are highly satisfactory, carbon monoxide is preferred as will be discussed hereinbelow. The complexed cuprous ion solution, designated at $Cu^+L_x$ where L is the ligand and x is 1 or 2, can be provided from a separate supply in the processing stream. During the reduction leaching, it becomes oxidized to the cupric stage while iron and manganese are reduced. If desired, the cupric ions can be withdrawn from the system for other use or treatment or even discarded as waste; however, economics will most likely favor a recycling stream whereby cuprous ions are regenerated.

The overall redox leaching reactions for the two basic ores discussed herein are embodied in the following equations:

Laterite (and $Fe^{3+}$ phase in Mn nodules)   I

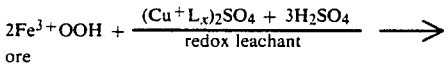

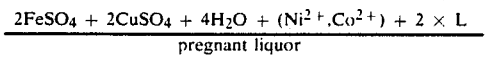

Mn nodules (and $Mn^{4+}$ phase in laterites)   II

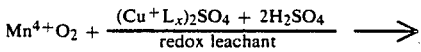

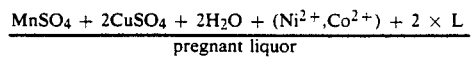

Equations I and II could be modified as will be understood by those skilled in the art where hydrochloric acid is substituted for sulfuric.

Moreover, as stated hereinabove the ligand L can also be $Cl^-$. Those skilled in the art will appreciate that an excess of anion is required to maintain copper soluble in the process solution and therefore excess hydrochloric acid or other chlorides such as $MgCl_2$ should be present. While the work which is discussed hereinbelow exemplifies two of the ligands, CO and $CH_3CN$, it is to be understood that $Cl^-$ could also be employed and that the present invention does not include this ligand.

After the appropriate time, the leached ore is separated as to liquids, solids and gases according to known engineering techniques. The ligand, CO or $CH_3CN$ is withdrawn in one stream for recycling if desired; the pregnant liquor containing $Fe^{2+}$, $Mn^{2+}$, $Cu^{2+}$, $Ni^{2+}$ and $Co^{2+}$ is withdrawn for extraction of nickel and cobalt and/or recycling of the other metals. Solid waste material is easily separated and discarded or separately treated for extraction of chromium and possibly precious metals such as Au, Pd, Pt and Rh wherever analysis indicates a sufficient content to make extraction feasible. Generally, the insoluble residue or waste will be enriched in these metals, as the process of the present invention does not solubilize them. One precious metal, silver, is solubilized where the ligand is XRCN. It can be removed by cementation with copper powder.

Regarding the regeneration of the cuprous ion reductant, the cupric salt from the redox leaching can be reduced with a quinolic compound, $QH_2$ which itself is oxidized to the quinone Q according to the following equation:

Regeneration of $(CuL_2)_2SO_4$ Reductant   III

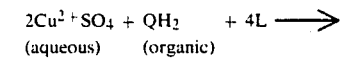

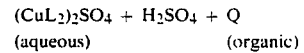

Alternatively, the cuprous ions can also be regenerated via $H_2$ or CO or syngas, $H_2/CO$, as will be discussed hereinbelow.

With reference now to the drawings and FIG. 1, the ARIS process shall first be broadly and schematically described and then be considered in greater detail, with other processes of the invention, in subsequent figures. The ore feed, laterite or manganese nodule properly ground, is contacted with the aqueous cuprous ion reductant in a reactor, 10. It is to be understood that the process can be conducted as a batch or continuously in co-current or counter-current tanks or as otherwise known, and that the selection of any particular reactor system does not constitute a limitation of the present invention. The leaching is done, in acid medium from a supply 11 with stabilized aqueous cuprous solution, stream 12. The cuprous solution can be provided from a recycling step, depicted in box 13.

Leaching time for laterites is approximately 45 minutes, for manganese nodules, it is about three minutes. Leaching is conducted at low temperature, on the order of from about 20° to 90° C., with 50° C. being preferred. Pressure is also low, ranging from atmospheric up to about 15 atmospheres (1.5 MPa). Where the complexing ligand is $CH_3CN$, atmospheric pressure is satisfactory in an atmosphere such as $CO/H_2$ or other in order to exclude air. Where the ligand is CO, about 15 atmospheres or less is suitable to maintain the $Cu^+$ solubilized to the desired concentrations.

The complexing ligand L can be withdrawn from the reactor 10 via stream 14 and fed to the recycling step 13 where it will be combined with the regenerated cuprous ions and returned to reactor 10 via stream 12. Withdrawal from reactor 10 is especially favored where L is CO.

The reduced slurry from reactor 10 passes via stream 15 and is allowed to separate and depressurize if necessary in separator 16. The complexing ligand L can also be recycled via stream 14 taken from separator 16 to box 13 and the solids portions or tailings passes via stream 17 for disposal or separate treatments such as for the recovery of chromium. While chromium recovery is not specifically provided for in this process, as noted hereinabove, greater concentrations in the tailings or waste may make recovery feasible. Stream 18 carries the pregnant liquor, e.g., $Fe^{2+}$, $Mn^{2+}$, $Cu^{2+}$, $Ni^{2+}$ and $Co^{2+}$ as well as any $Ag^+$ to box 19 where a step or steps for the extraction of iron, manganese, nickel and/or cobalt and/or silver is conducted. Such steps are known in the art and therefore are not specifically described.

The removal of these metal ions at box 19 will leave a separate aqueous stream 20 of cupric ions to be fed to box 13 for regeneration of the cuprous ions, with a stabilizing ligand L. This is accomplished in 13 with a reductant from stream 21 and the recycle of the ligand via stream 14. Before proceeding with a discussion of the regeneration process in box 13, it should be noted that the various metals can be removed at other stages such as, by way of example, iron and manganese first followed by nickel and/or cobalt at another stage, or vice-versa.

All of the pregnant liquor can also go to the regeneration step box 13 in which instance nickel and cobalt will pass through unchanged and can be extracted from stream 12 prior to reaching reactor 10. Iron could also be withdrawn from stream 12 or retained with the cuprous ions and fed to reactor 10. Usefulness of ferrous ions in this manner will be discussed hereinbelow. The manganese ions would be of no use in reactor 10 and therefore should be withdrawn from stream 12 or before reaching step 13 in order to maintain maximum economy. It is to be understood that the patentability of the processes disclosed herein, as well as their operability, is not dependent upon a particular mode or time for the extraction of $Fe^{2+}$, $Mn^{2+}$, $Ni^{2+}$, or $Co^{2+}$ from solution. The processes make these metals available for extraction as they are leached from the ore feed and provide for regeneration of the stabilized cuprous ions for reactor 10 in all but one instance to be discussed hereinbelow.

Now, with respect to the lixiviant regeneration, cupric to cuprous, which has been depicted in step 13 of FIG. 1, greater detail shall be provided by referring to FIGS. 2-5 and the following explanation. In the regeneration step, the cupric ions are reduced to the cuprous state and the latter are combined and stabilized with the ligand L. Reduction of the cupric ions can be achieved in several manners and in FIG. 2 the use of a quinolic compound, designated generally as $QH_2$, shall be discussed first.

Quinol or hydroquinone, the dihydroxy alcohol of benzene, can be employed for the reduction step as can the anthraquinols, $AQH_2$, and naphthoquinols, $NQH_2$. Particularly useful quinolics are disclosed in U.S. Pat. Nos. 3,820,979, 4,032,331, 4,032,332 and 4,033,765, the subject matter of which is incorporated herein by reference. These patents are directed toward the recovery of copper metal, $Cu°$ from cupric ions.

Quinolics, a term used herein for the foregoing compounds are organic and employed in a water immiscible solvent mixture comprising non-polar compounds, e.g., aromatics such as alkyl toluenes and alkyl naphthalenes and polar compounds such as alcohols and various esters. As they react with cupric ions, they become oxidized to the quinonic species. The quinolic compound selected with the proper solvent mixture is fed via stream 25 to a reactor 26 as is the cupric ion stream 20 and the ligand via stream 14 or otherwise. The ligand L can be either a nitrile or carbon monoxide, as discussed hereinabove, or in the instance of a separate process for treatment of cupric ions, both the ligand stream and the cupric ion stream can be provided from sources other than those resulting from the process depicted in FIG. 1.

Dealing first with the instance where L is a nitrile, and particularly acetonitrile, it is fed to the reactor 26 and very quickly combines with the cuprous ions resulting from the reaction of the quinolic compound and the acidic cupric ions. The combination of the nitrile ligand XRCN, with cuprous ions in reactor 26 occurs under pressure of from about 0.1 MPa to about 1.0 MPa at a temperature of from about 20° to 90° C. Reaction time is short, taking from about five to 20 minutes. The cupric ions are provided in an acidic aqueous solution, e.g., $CuSO_4$ and therefore a two liquid phase mixture occurs in reactor 26 and passes via stream 28 to a separator 29. The aqueous, acidic cuprous ligand portion becomes stream 12 of FIG. 1 which is fed to the first reactor 10 for ore reduction.

The organic phase, which now comprises the oxidized quinonic compound, designated herein as a shorthand notation for quinones, anthraquinones or naphthoquinones passes via stream 30 to a step 31 for regeneration of the respective quinolic, designated herein as $QH_2$. Regeneration or reduction to the quinolic can be achieved with hydrogen gas over a conventional hydrogenation catalyst such as Raney nickel, or platinum or palladium supported on conventional supports at a pressure ranging between about 0.1 and 1.2 MPa and at a temperature of from about 20° to 80° C. The process of hydrogen reduction of quinones to their respective quinols is otherwise known in the production of hydrogen peroxide and need not be further detailed herein. The reduced quinolic, $QH_2$ is fed via stream 25 to the reactor 26 as was discussed hereinabove. Alternatively, a fresh supply of quinolic, not shown, could be fed to the reactor 26 where its regeneration is not desired.

The entire step of lixiviant regeneration 13 thus described is set forth in greater detail in my aforementioned U.S. Pat. No. 4,095,975, the subject matter of which is also incorporated herein by reference. That patent teaches the recovery of copper metal via disproportionation of a $Cu^+L$ solution wherein L is acetonitrile. In addition to acetonitrile other nitriles, designated generally by the formula XRCN, can be employed where R is aliphatic having from one to about four carbon atoms and X is —OH or H. Such examples include 2-hydroxy-cyanoethane, acrylonitrile and propionitrile. These nitriles are disclosed in U.S. Pat. No. 3,865,744, the subject matter of which is also incorporated herein by reference. Leaching of laterites and sea nodules with a Cu+CH$_3$CN lixiviant is exemplified hereinbelow.

While R has been defined as an aliphatic having from one to four carbon atoms, other moieties having more than four carbon atoms are not necessarily inoperable or to be precluded. It has been recognized only that they may not be economically practical and, therefore, an upper limit of four carbons has been recited.

Although the particular regeneration of cupric ions, stabilized with a nitrile ligand, may not be novel per se, it is a step in the ARIS process and its use in conjunction with the redox leaching of ores is believed to be novel. In lieu of a nitrile ligand, L can also be carbon monoxide as discussed hereinabove. Where L is CO, the regeneration of cuprous ions from cupric by reduction with quinols is not known and is therefore novel as a separate process or in conjunction with the other steps of the ARIS process.

Figure 2:
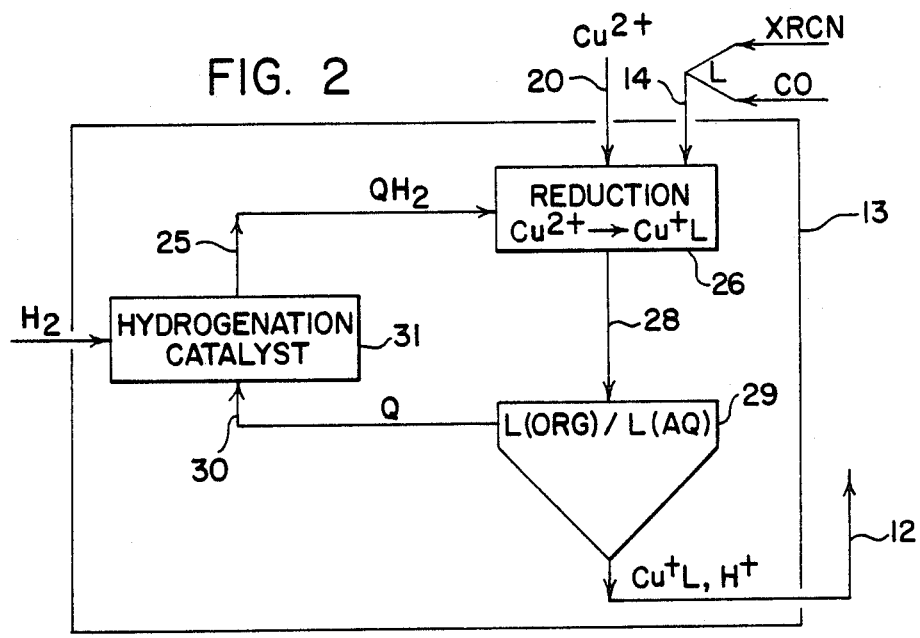
FIG. 2 is a schematic diagram illustrating an independent process for the regeneration of cuprous ion solutions with various stabilizing ligands which can be employed in conjunction with the ARIS process.

The procedure to follow where L is CO is much like the foregoing description of FIG. 2, in that a quinolic is again employed, and therefore a total description shall not be repeated. The ligand CO can be provided via stream 14 from reactor 10 (FIG. 1). It is combined with the quinolic compound and aqueous acid cupric solution in reactor 26 under pressure of from about 0.1 MPa to as high as 1.5 MPa at a temperature of from about 20° to 90° C. Reaction is quick, taking from about five to 20 minutes. Where L is CO, a pressure in excess of atmospheric must be maintained, otherwise the ligand will escape and the cuprous ions will disproportionate to copper metal and cupric ions. Reduction of cupric to cuprous is exemplified hereinbelow as is the leaching of lateritic ore with Cu+CO lixiviant.

The foregoing regeneration of cuprous ions occurred in a one-step process, i.e., in reactor 26. A two-step regeneration is also possible with quinolic compounds and will be described with reference now to FIG. 3. Practice of this regeneration requires a division of the aqueous, acid cupric ion stream 20 into two streams 20A and 20B. Generally, about 50/50 volumes will be suitable. Stream 20A is reduced directly to copper metal in reactor 35 with a quinolic compound QH$_2$ as disclosed hereinabove. In the absence of a ligand, the cupric ions are reduced directly to the metal according to the aforementioned U.S. Pat. No. 3,820,979. Streams 36 contains three phases: the organic quinone Q with solvents, the aqueous acid H$_2$SO$_4$ from CuSO$_4$ and, the solid copper metal powder. It is passed to a separator 38 wherein the quinonic compound Q is transferred via stream 39 to a reactor 40 where it is reduced to the corresponding quinolic QH$_2$ with hydrogen gas in the same manner as described in FIG. 2. The quinolic is then returned via stream 41 to the reactor 35.

The remaining slurry from separator 38 comprising the aqueous acid and copper metal is fed via stream 42 to a second reactor 43 to which is fed stream 20B. In this reactor, the combination of cupric ions and copper metal with the ligand via stream 14 results in the generation of the stabilized cuprous ligand or stream 12 for the reactor 10 in FIG. 1. The foregoing two-step regeneration of cuprous ions stabilized with a ligand is believed to be novel alone as well as in combination with the other steps of the ARIS process.

Figure 4:
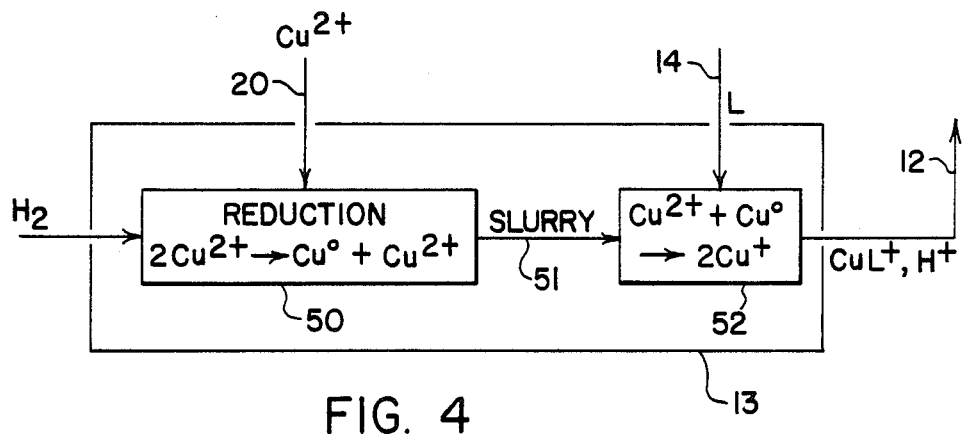
FIG. 4 is a schematic diagram illustrating an alternative process for cuprous ion regeneration which can be employed in conjunction with the ARIS process.

Other two-step processes are also possible which do not utilize a quinolic compound. Such processes are set forth in FIG. 4, wherein hydrogen gas is utilized as the reductant and FIG. 5, wherein carbon monoxide is utilized. With reference first to FIG. 4, the aqueous acidic cupric ion stream 20 is fed in a first step to an autoclave 50 to which is also fed hydrogen gas. This reduction is conducted at pressures ranging between about 15 and 50 atmospheres, at a temperature of from about 200° to 280° C. and for about 0.5 to 3 hours. In the second step, a slurry is fed, from autoclave 50, via stream 51, comprising copper metal, cupric ions and H+ (acid) to a reactor 52 wherein it is combined, after appropriate cooling, with a ligand such as from stream 14. The resulting stabilized cuprous ion Cu+L and acid H+ is provided via stream 12 to reactor 10 (FIG. 1). Although this particular regeneration of cuprous ions may not be novel per se, it is a step in the ARIS process and its use in conjunction with the redox leaching of ores is believed to be novel.

Before combining the slurry with the ligand, the slurry must be appropriately cooled to accommodate the particular type of ligand. Cooling to at least 90° C. or under is necessary where the ligand is XRCN and cooling to at least 140° C. or under is necessary where the ligand is CO. Such cooling is to be followed in the two-step regeneration processes without quinolics where hydrogen, carbon monoxide or syngas is employed.

Figure 5:
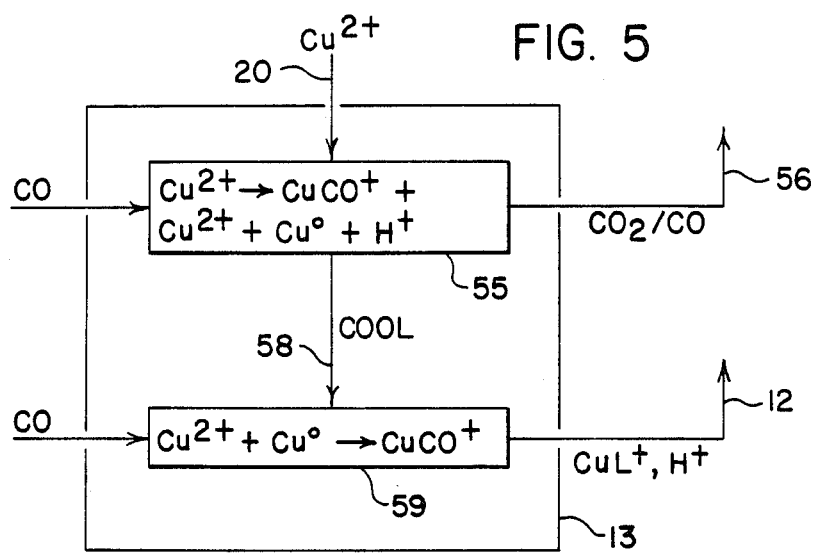
FIG. 5 is a schematic diagram illustrating an alternative process for cuprous ion regeneration which can be employed in conjunction with the ARIS process.

With reference to FIG. 5, the aqueous acidic cupric ion stream 20 is again fed in the first step to an autoclave 55 to be reacted with carbon monoxide as a reductant, not primarily as a ligand. Reduction is again high pressure and temperature on the order of 15 to 50 atmospheres and from about 150° to 260° C. for about 0.5 to 2 hours. A by-product gas stream comprising CO$_2$/CO is evolved which can be suitably utilized or disposed. The reaction of CO with an aqueous solution of CuSO$_4$ at elevated temperature (140° to 150° C.) and pressure has been described as a minor side reaction by E. Peters, T. Kurnsawa, F. Loewen and M. Nishitani in a paper entitled "A Carbonyl-Hydrometallurgy Method for Refining Copper" presented at the Joint Meeting of MMIJ-AIME 1972, Tokyo, Print No. T IV c4. The reaction is as follows:

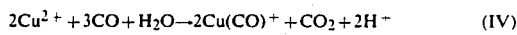

$$2Cu^{2+} + 3CO + H_2O \rightarrow 2Cu(CO)^+ + CO_2 + 2H^+ \qquad (IV)$$

Some stabilized cuprous ions result as CuCO+, along with some copper metal and cupric ions. This slurry is allowed to cool to a temperature of at least about 140° C. or under, as it passes via stream 58 to reactor 59 where, in the second step, it is combined with carbon monoxide as a ligand. Again, the stabilized cuprous ion stream 12 results. The CO ligand supply could be provided from stream 14, recycled from reactor 10 (FIG. 1) or independently.

The foregoing two-step regeneration of cuprous ions is believed to be novel alone as well as in combination with the other steps of the ARIS process. It is to be understood that a combination of FIGS. 4 and 5 could also be practiced utilizing H$_2$/CO or syngas or yet another novel reduction step for the regeneration of cuprous ions for the ARIS process. Inasmuch as the latter would merely be a combination of the foregoing descriptions, a detail discussion thereof is not deemed necessary.

Having described several of the possible regenerations of $Cu^+$ ions stabilized against disproportionation with CO or $C_3CN$ and the like, it should be noted that disproportionation may be desirable, to a degree, in the ARIS process. Recognizing the wide variety of compositions represented by laterite and manganese ores, it is possible that some copper compounds can be present. As a result of the leaching in reactor 10, these become freed as $Cu^{2+}$ ions and subsequently reduced to $Cu^+$ ions in step 13. After a period of several recyclings via stream 12, the copper ion content would build up to an undesirable concentration.

Figure 6:
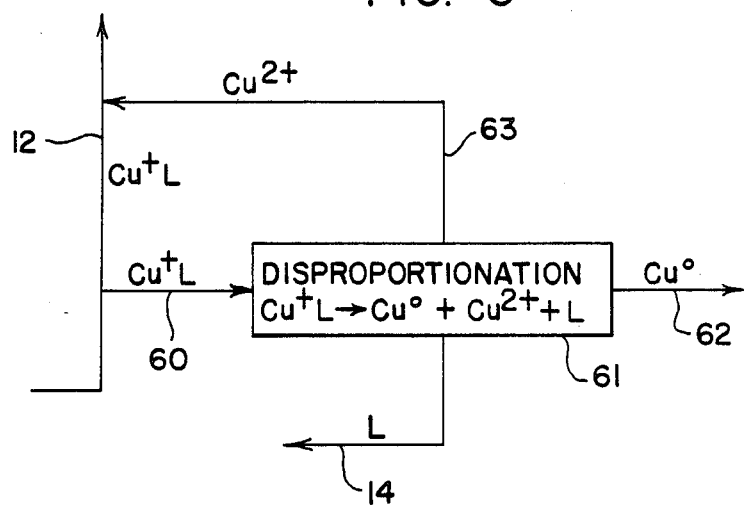
FIG. 6 is a schematic diagram depicting a process for the removal of copper from a process such as depicted in FIG. 1.

Thus, at least one manner by which to control the amount would be to allow a portion of the stabilized ions $Cu^+L$ to disproportionate, producing copper metal and cupric ions approximately in equal amounts. A bleed stream, for instance, could be drawn off of stream 12, as is depicted in FIG. 6. There, stream 60 will remove a predetermined amount necessary to reduce the overall flow of copper through the process where new copper is continuously being leached and added. Stream 60 is fed to a suitable processing step 61 where the ligand L is removed either to recycle stream 14 or for other use or handling. Copper metal is removed via stream 62 and cuprous ions are returned to stream 12 via stream 63.

Figure 3:
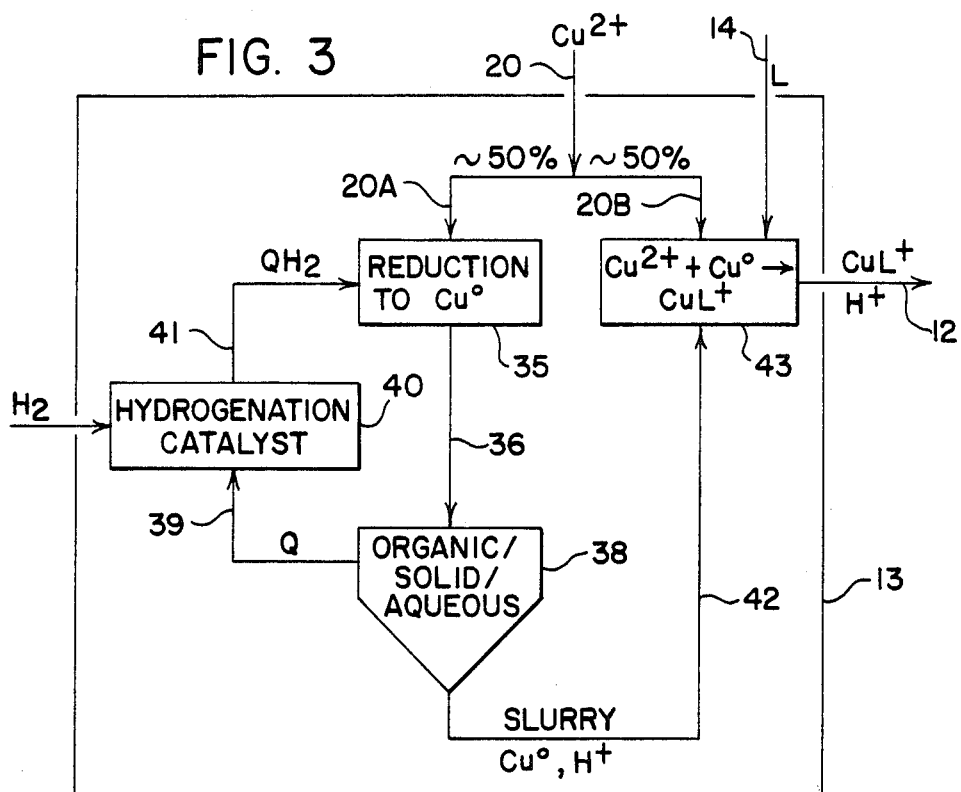
FIG. 3 is a schematic diagram illustrating an alternative independent process for cuprous ion regeneration which can be employed in conjunction with the ARIS process.

Removal of the ligand in step 61 is conventional; for CO depressurization will result in disproportionation while for an organic nitrile, distillation of the ligand will destabilize the $Cu^+$ ions. It is to be appreciated that the bleed stream 60 can comprise other components as only the cuprous ions will be affected. Alternatively, other processing steps can be employed for excess copper removal such as, electrolytically or cementation with iron metal. Also, the point of copper removal is not necessarily limiting on the practice of the present invention. One other step could be the reduction of $Cu^{2+}$ to $Cu^°$, as depicted in FIG. 3, with a quinolic so long as the copper metal was not subsequently treated in reactor 43 to form $Cu^+L$.

Thus far, the ARIS process has been described wherein stabilized cuprous ions in acid medium are utilized to leach lateritic ores and manganese sea nodules and, wherein the cuprous ions are regenerated. More broadly, a modification of the ARIS process is also contemplated as is next described with reference to FIG. 7. The process is comparable to that discussed with reference to FIG. 1 except regeneration of the cuprous ions is not included.

Crushed ore is again fed to the reactor 10 with a supply of acid to maintain a steady pH. Stabilized cuprous ions are provided from an independent source 60 via stream 12. If the ligand is CO, it can be vented from reactor 10 via stream 14 and suitably handled. The slurry from reactor 10 is fed via stream 15 to the separator 16, where nitrile ligands are removed by stream 14, solid tailings and the like pass via stream 17 and the pregnant liquor passes via stream 18 to a suitable processing step or steps, box 19 where iron, manganese, copper, nickel and/or cobalt can be extracted as desired. Reaction conditions such as temperature, pressure and pH are the same as set forth hereinabove for the description of FIG. 1.

Another modification to the ARIS process exists where ferrous ions $Fe^{2+}$ with the cuprous ions previously described are employed in a leaching step, e.g., reactor 10 or other. It will first be recalled that ferrous ions result from the leaching of laterites in reactor 10 with the acidic cuprous ligand solution, stream 12. Ferrous ions would be useful on a feed stream of manganese sea nodules or a terrestrial manganese ore. An instance of the latter could be drawn from a lateritic deposit which is most often characterized by a vertical composition profile. Whereas the nickeliferous Limonite is preferred for the feed to reactor 10 with a cuprous ion reduction, the overlying hematitic cap is often more concentrated in manganese which, in turn, will carry a higher content of cobalt.

Inasmuch as the ferrous ions can only leach a manganese ore, that ore is the only instance where cuprous and ferrous solutions could be combined. If, for instance, the cuprous and ferrous solutions were employed on a lateritic ore, the cuprous ions would selectively leach first the manganese portion, this being preferred to cuprous attack of the $Fe_2O_3$ phase as well as ferrous attack of the $MnO_2$ phase. In a short time, the manganese phase would be reduced, leaving no ore for the ferrous ions which, of course, will not react with the $Fe_2O_3$ phase.

Figure 8:
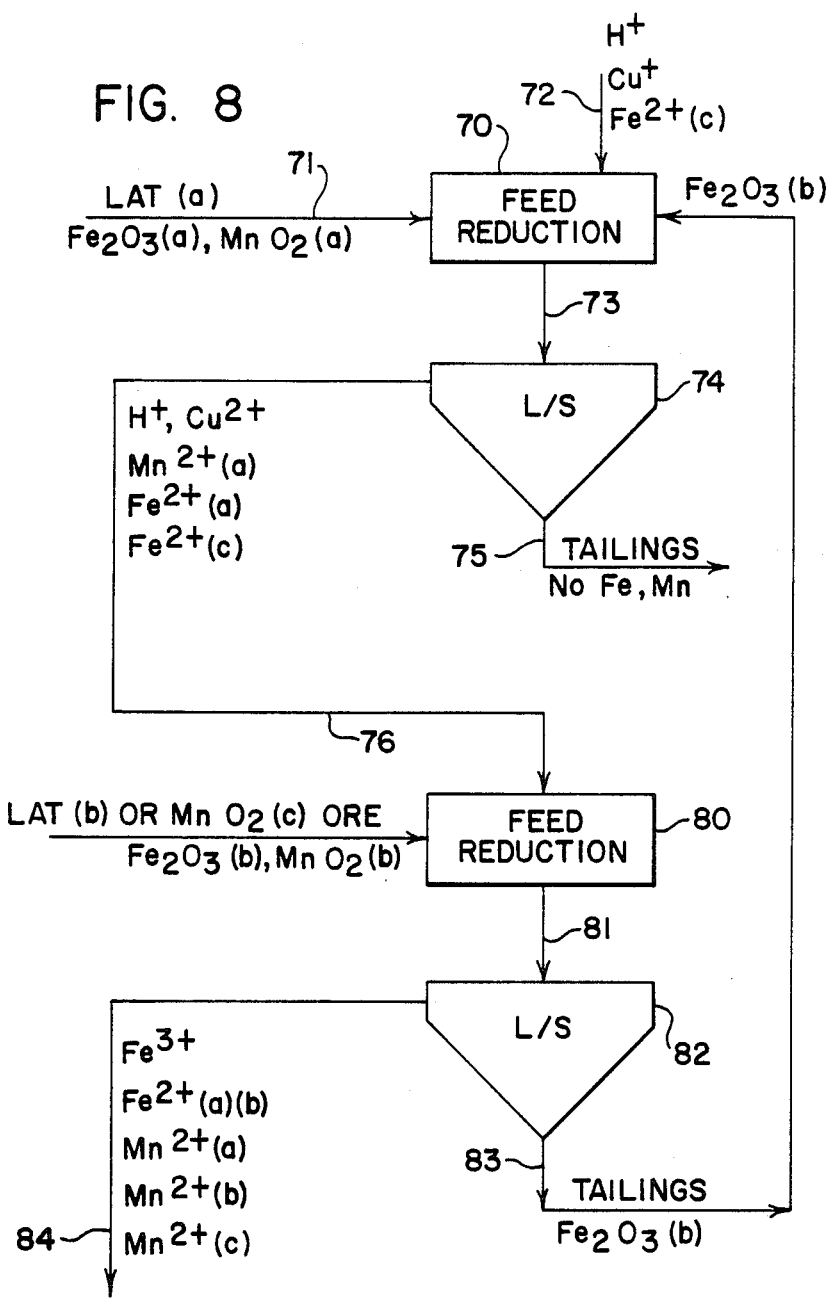
FIG. 8 is a schematic diagram illustrating another overall process of the present invention for the reduction of ores.

With the foregoing as a background, reference to FIG. 8 should now be made wherein this embodiment will be further developed. A lateritic ore feed, Lat(a), is fed to a reactor 70, comparable to the reactor 10, via stream 71. The lixiviant solution is provided via stream 72 and includes acidic cuprous ions, properly stabilized, comparable to stream 12 (FIG. 1) and ferrous ions $Fe^{2+}(c)$ from a separate source. The latter ions are optional and will be employed primarily in a second, separate leaching step set forth hereinbelow. Temperature, pressure and pH for this step is the same as was disclosed in conjunction with the description of FIG. 1. A slurry results which is fed via stream 73 to a separator 74. Solids or tailings exit via stream 75 for the desired treatment, disposal or other handling and are essentially free from Fe and Mn. Meanwhile, the pregnant liquor, stream 76, is fed to a second leach reactor 80. The pregnant liquor comprises $Mn^{2+}(a)$ ions and $Fe^{2+}(a)$ ions from Lat(a) and $Fe^{2+}(b)$ and $Fe^{2+}(c)$ ions. $Co^{2+}(a)$ and $Ni^{2+}(a)$ also result but have been omitted from the drawing to simplify the latter.

Into reactor 80 is also fed, via stream 81 a second lateritic ore, Lat(b) and/or manganese ore (c), sea nodules or terrestrial. The leaching that will occur will be based only upon $Fe^{2+}$ ions, $Fe^{2+}(a)$, (b) and (c), inasmuch as no $Cu^+$ ions are left over from reactor 70 or otherwise fed into 80. Reaction conditions include the same temperature range of 20° to 90° C., a pressure ranging from ambient to about 0.3 MPa and the same overall pH. The resulting slurry passes via stream 81 to separator 82. Where the $Fe_2O_3$ portion of laterite (b) contains desirable amounts of Ni, the stream 83 can carry the solids, essentially unreacted, and tailings to the first reactor 70 where they can be reacted with $Cu^+$ ions. If the Ni content is too low or otherwise undesirable, stream 83 can be discarded (not shown). The pregnant liquor stream 84 now comprises $Cu^{2+}$ ions unchanged from the first redox leaching, reactor 70, $Fe^{3+}$ ions from the leaching reaction, $Mn^{2+}$ ions from laterites (a) and (b) as well as the manganese ore feed (a). The Mn ore having been solubilized, $Co^{2+}(b)$ ions will now also be present but again, do not appear in the drawing.

It will be appreciated from discussions pertaining to the other flow diagrams, that separations of the accessed $Ni^{2+}$ and $Co^{2+}$ ions could have been inserted into the process depicted in FIG. 8 and any convenient stage such as off of streams 76, 83 or 84. Similarly, the $Cu^{2+}$ ions could have been recycled for $Cu^+$ regeneration, per FIGS. 2-5, at any of these streams.

Of course, variations of the process set forth in FIG. 8 are contemplated within the scope of the present invention. Thus, while FIG. 8 depicts a second leaching step to be utilized in conjunction with the ARIS process set forth in FIG. 1 or the modified process set forth in FIG. 7, i.e., no $Cu^+$ ion regeneration, it is entirely possible that the leaching in the second reactor 80 could comprise an independent process for the selective leaching of iron oxide containing ores which will be briefly discussed with reference to FIG. 9.

Reactor 90 is there fed, via stream 91, an ore having a useful content of manganese which, in turn, carries a desirable amount of cobalt. Such ores were discussed with reference to FIG. 8 and need not be repeated here. However, it should be borne in mind that the process of FIG. 9 is one that can be employed as a selective leaching of laterites and the like where it is desirable to extract only the cobalt. An acidic leach solution comprising $Fe^{2+}$ ions is fed via stream 92 and produces a slurry, stream 93 which is fed to a separator 94. Again, solids comprising unreacted $Fe_2O_3$ and tailings exit via stream 95 for desired handling and a pregnant liquor stream 96, is drawn off containing $Fe^{3+}$ ions from the leaching, and solubilized $Mn^{2+}$, $Ni^{2+}$ and $Co^{2+}$ for further separation in box 98 and/or use as desired.

Figure 7:
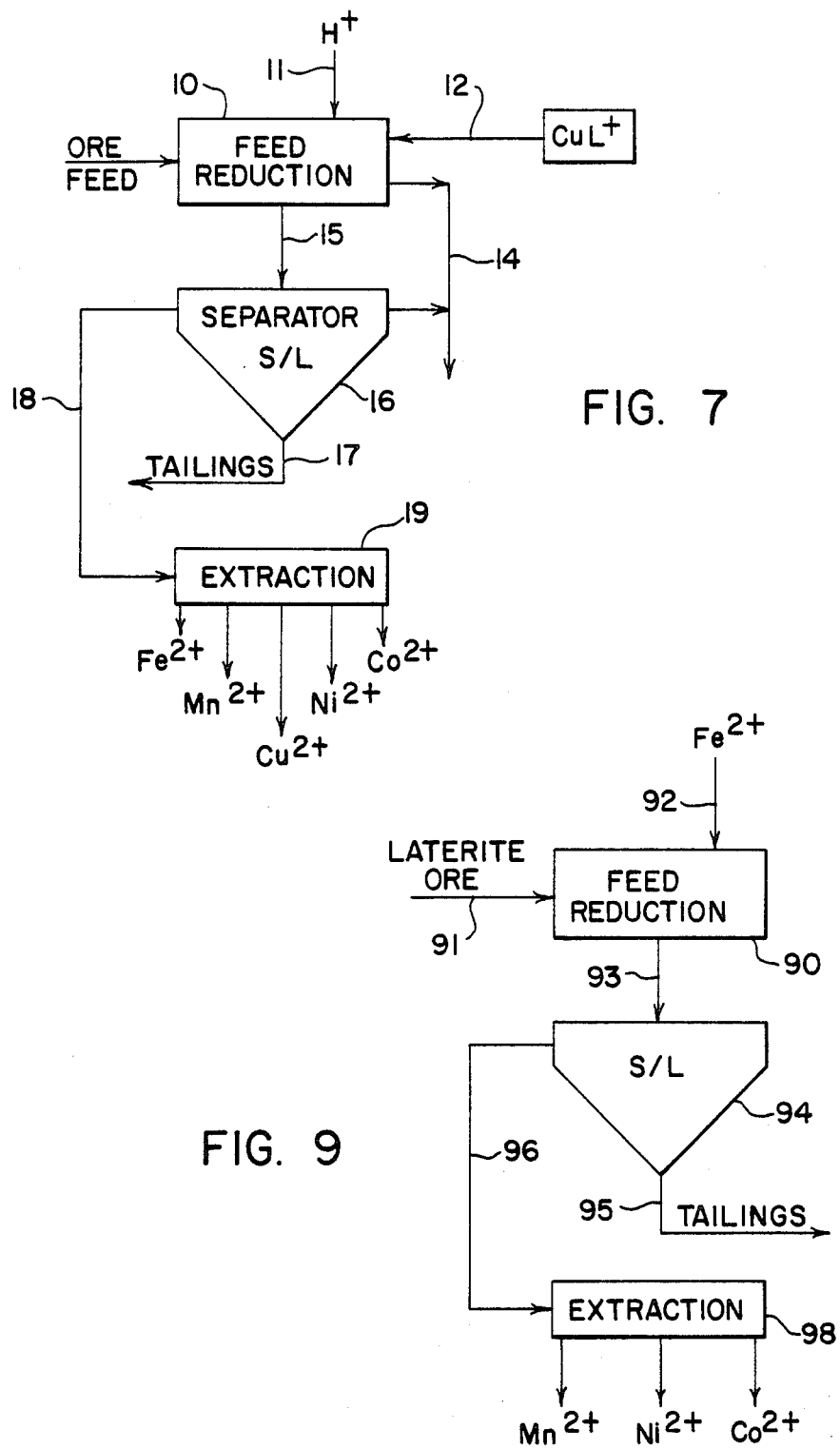
FIG. 7 is a schematic diagram illustrating another process of the present invention for the reduction of ores.

Although not specifically shown in combination with FIG. 9, any $Fe_2O_3$ content could then be fed to a series of steps are provided in FIG. 1 or 7 wherein lateritic ore feed is treated with $Cu^+$ ions. The latter would constitute a two-step differential leaching technique whereby the manganese and a high concentration of cobalt was first accessed and then the iron with a high concentration of nickel followed.

A reduction of a laterite ore, employing $Fe^{2+}$ ions and inert $Cu^{2+}$ ions selectively to leach Co and Mn has been provided hereinbelow as Example No. 25, reported in Table X.

General Leaching Procedure

In the several examples which are detailed hereinbelow, leaching of laterites was carried out in a 500 ml jacketed glass reactor which was provided with a stirrer, pH electrode, thermometer, refluxing condenser, sampling port and a nitrogen gas sparging tube, as well as an inlet for acid addition. The temperature in the flask was maintained at within ±1° C. by circulating water from a thermostated bath into the jacket of the reactor.

A pH controller was employed to monitor and maintain the desired constant pH during the leaching experiments. A peristaltic pump, activated by the pH controller, was used to add a (50:50 by volume) solution of $H_2SO_4/H_2O$ into the reactor during the course of the redox leaching experiments. The total amount of added acid solution was measured at the end of each experiment.

Nitrogen gas was passed throughout the reactor at a low flow rate, however, a complete exclusion of air during these preliminary experiments was not attempted. Solution samples were taken at various time intervals with a 5 ml pipette through a ground joint opening in the reactor cover at which time air was free to diffuse into the reactor. The stirring was stopped and the slurry allowed to settle for one minute before the sample was withdrawn. The 5 ml sample was taken from as close to the surface as possible to minimize the amount of solids withdrawn. The amount of solids taken with the sample was small and not measured, howver, the concentrations obtained and reported herein are somewhat lower than the actual ones due to the presence of these small amounts of solids in the samples taken. The samples taken were immediately "quenched" in an acidic solution containing $H_2O_2$ as an oxidant for cuprous and ferrous ions and brought to 100 ml total volume. Within five minutes, part of this solution was filtered to yield two parallel samples of about 25 ml each. These were then labeled for ready identification.

All samples taken and prepared in the above manner were analyzed by Atomic Absorption Spectroscopy. The concentrations of nickel, iron, cobalt, manganese, chromium, magnesium, silicon and aluminum in the leach solution at various sampling times were calculated from the analytical results.

The general procedure for each series of redox leaching experiments was as follows: The measured amount of cupric sulfate solution, at the desired pH, was introduced first into the reactor flask and allowed to reach the selected operating temperature while stirring and purging with nitrogen to displace air from the reactor, and most of the dissolved oxygen. The calculated amounts of copper powder and acetonitrile were then introduced into the reator and stirring continued until the copper powder dissolved completely. Dissolution of copper powder yielded the desired stabilized cuprous lixiviant for the redox leaching of ore.

The stirring was then stopped and the weighed amount (50 g) of laterite was added into the cuprous solution. This addition was completed within three minutes after which stirring commenced. While some reaction took place during this addition time, time zero for the redox leaching was considered to coincide with the time when stirring commenced.

Leaching of Laterites with $Cu^+(CH_3CN)_x$ Examples No. 1-9

Gasquet Mountain laterite, having the composition reported in Table I hereinabove, was leached with the $Cu^+(CH_3CN)_x$ lixiviant in Examples No. 2-9 discussed hereinbelow. 50 g samples of $-100+150$ mesh dry screened laterite was treated with the leach solution and under the conditions found in Table II. The copper reductant solution was made by dissolving 11.66 g of copper metal in 382 ml of water (unless otherwise specified) containing 0.257 moles of $CuSO_4$, to which 59 ml of $CH_3CN$ (unless otherwise specified) was added. Total volume of all but one solution was 441 ml. The initial concentration of cuprous ions, approximately 0.83M, was calculated and fixed to a 20 percent excess over that stoichiometrically necessary to reduce all Fe(III) and Mn(IV) to $Fe^{2+}$ and $Mn^{2+}$. This concentration was employed for Examples 2-8, half the concentration was employed for Example No. 9 and zero for Example No. 1, a control, where leaching was conducted in the absence of the active cuprous ions. Concentrations of metal ions at different sampling times ranging between three to as many as 420 minutes appear in Table III.

TABLE II

Redox Leaching with Cuprous Acetonitrile and Reaction Conditions

| Example No. | 1[a] | 2 | 3 | 4 | 5 | 6 | 7 | 8 | 9 |
|---|---|---|---|---|---|---|---|---|---|
| T° C. | 45 | 45 | 25 | 65 | 45 | 45 | 45 | 45 | 45 |
| pH | 1.5 | 2.0 | 2.0 | 2.0 | 1.5 | 2.5 | 2.0 | 2.0 | 2.0 |
| Cu° g | 0 | 11.66 | 11.66 | 11.66 | 11.66 | 11.66 | 11.66 | 11.66 | 11.66 |
| Cu # moles | 0 | 0.257 | 0.257 | 0.257 | 0.257 | 0.257 | 0.270 | 0.244 | 0.257 |
| CH$_3$CN ml | 0 | 59 | 59 | 59 | 59 | 59 | 39 | 78 | 78 |
| H$_2$O ml | 441 | 382 | 382 | 382 | 382 | 382 | 402 | 363 | 803 |
| Total Vol | 441 | 441 | 441 | 441 | 441 | 441 | 441 | 441 | 881 |

[a]Example No. 1 was conducted as a control, no copper or acetonitrile was added

TABLE III

Metal Ion Concentrations (ppm) as a Function of Leaching Time for Examples 1-9

| Example No. | Rxn time (min) | Ni | Fe | Co | Mn | Cr |
|---|---|---|---|---|---|---|
| 1 | 3 | 98 | 326 | 77 | 150 | 4 |
|   | 90 | 226 | 1130 | 87 | 173 | 14 |
|   | 300 | 366 | 2200 | 111 | 258 | 28 |
| 2 | 3 | 316 | 550 | 158 | 596 | 30 |
|   | 30 | 670 | 12850 | 212 | 584 | 54 |
|   | 330 | 956 | 23500 | 224 | 576 | 112 |
|   | 420 | 972 | 25950 | 224 | 566 | 120 |
| 3 | 3 | 212 | 850 | 161 | 600 | 10 |
|   | 33 | 400 | 5400 | 212 | 580 | 20 |
|   | 333 | 782 | 19000 | 228 | 574 | 60 |
| 4 | 4 | 516 | 7700 | 164 | — | 30 |
|   | 30 | 830 | 16500 | 206 | — | 86 |
|   | 330 | 1058 | 25550 | 230 | 574 | 160 |
| 5 | 3 | 452 | 7210 | 216 | 576 | 32 |
|   | 30 | 842 | 19780 | 238 | 614 | 96 |
|   | 240 | 1010 | 27910 | 224 | 584 | 166 |
| 6 | 3 | 220 | 760 | 200 | 574 | 4 |
|   | 90 | 480 | 7750 | 222 | 610 | 34 |
|   | 275 | 792 | 18270 | 228 | 598 | 90 |
| 7 | 3 | 388 | 4065 | 224 | 590 | 20 |
|   | 15 | 572 | 9648 | 226 | 586 | 44 |
|   | 210 | 1042 | 25745 | 230 | 544 | 150 |
| 8 | 3 | 306 | 1897 | 212 | 538 | 10 |
|   | 60 | 646 | 9919 | 230 | 556 | 48 |
|   | 240 | 934 | 17778 | 232 | 542 | 104 |
| 9 | 3 | 184 | 1376 | 106 | 292 | 8 |
|   | 15 | 300 | 4416 | 107 | 292 | 34 |
|   | 270 | 564 | 11910 | 107 | 298 | 72 |

With reference to Table III, it will readily be noted that a significant amount of the metals Ni, Fe, Co and Mn were leached from the laterite ore with the Cu+CH$_3$CN lixiviant as compared to Example No. 1 where the copper reductant was not employed.

Decreasing the reaction temperature to 25° C., Example No. 3, resulted in a corresponding decrease in metal ion yields over other examples, conducted at 45° C. On the other hand increasing the temperature to 65° C., Example No. 4, did not significantly affect the yields thereby demonstrating that the process can be conducted at relatively low temperatures, such as 45° C.

The effects of pH between 1.5 and 2.5 and concentration of the copper reductant solution is also demonstrated in Table III. Generally, pH did not dramatically effect the leaching between 1.5 and 2.0, Examples No. 2 and 5, while increasing it to 2.5, Example No. 6, did decrease the yields. Reduction in the CH$_3$CN addition, Example No. 7, did not appear to effect yields, neither did dilution of the reductant, Example No. 9 did as long as at least the stoichiometric amount of Cu$^+$ was supplied.

Analysis of the metal ion concentrations reported in Table III also establishes that the leaching process of the present invention is highly selective insofar as most of the Ni, Co, Fe and Mn is leached from the ore while most of the Cr remains with the leach residue or tailings. It can readily be noted that about three times the Ni and 10 times the Fe content were accessed in Examples 2-9 as compared to Example 1, while Cr content remained relatively low in the pregnant liquor. In this manner, the tailings will be certain to carry a higher weight percent of Cr than the original ore, making recovery more economically feasible.

By selecting the right combination of temperature pH and leaching time it is possible to optimize the extraction of Ni and Co versus Cr. Drawing from specific examples reported in Table III, namely Nos. 2-6, exemplary optimization can be demonstrated as has been reported in Tables IV and V.

TABLE IV

Effect of Time, Temperature and pH on Metal Ion Concentrations

| Ex. No. | T° C. | pH | 30 | | | 60 | | | 330 | | |
|---|---|---|---|---|---|---|---|---|---|---|---|
|   |   |   | Cr | Ni | Co | Cr | Ni | Co | Cr | Ni | Co |
| 3 | 25 | 2.0 | 20 | 380 | 208 | 24 | 540 | 220 | 60 | 780 | 228 |
| 2 | 45 | 2.0 | 54 | 670 | 212 | 60 | 730 | 206 | 112 | 956 | 224 |
| 4 | 65 | 2.0 | 86 | 830 | 206 | 110 | 914 | 224 | 160 | 1058 | 230 |
| 5 | 45 | 1.5 | 96 | 842 | 238 | 125 | 920 | 232 | 175 | 1010 | 224 |
| 2 | 45 | 2.0 | 54 | 670 | 212 | 60 | 730 | 206 | 112 | 956 | 224 |
| 6 | 45 | 2.5 | 18 | 366 | 218 | 30 | 410 | 224 | 80 | 780 | 230 |

At a constant pH of 2.0 the lowest amount of Cr leached occurred where leaching continued for 30 minutes. Where greater times of 60 and 330 minutes were provided, some increase in Ni was observed but very little increase in Co. Temperature also had little effect of Co, but significantly greater effect on Cr and Ni. Maintaining a steady temperature, all three metal extractions generally increased as pH decreased (the solution was more acid), except for Co at 330 minutes.

A similar comparison can be made by examining the concentration ratios of Ni/Cr and Co/Cr at various sampling times provided in Table V.

TABLE V

| | | | Ni/Cr and Co/Cr Concentration Ratios | | | | | |
|---|---|---|---|---|---|---|---|---|
| | Time (min) | | | | | | 330 | |
| Ex. | Conc. ratio | | 30 | | 60 | | | Co/ |
| No. | T° C. | pH | Ni/Cr | Co/Cr | Ni/Cr | Co/Cr | Ni/Cr | Cr |
| 3 | 25 | 2.0 | 20.0 | 11.0 | 22.5 | 11.6 | 13.0 | 3.8 |
| 2 | 45 | 2.0 | 12.4 | 3.9 | 12.2 | 3.4 | 8.5 | 2.0 |
| 4 | 65 | 2.0 | 9.7 | 2.4 | 8.3 | 2.0 | 6.6 | 1.4 |
| 5 | 45 | 1.5 | 8.8 | 2.5 | 7.4 | 1.9 | 5.8 | 1.3 |
| 2 | 45 | 2.0 | 12.4 | 3.9 | 12.2 | 3.4 | 8.5 | 2.0 |
| 6 | 45 | 2.5 | 20.3 | 12.1 | 13.7 | 7.5 | 9.8 | 2.9 |

The highest Ni/Cr concentration occurred at the lowest temperature and pH of 2.0 and decreased as the temperature rose. Increasing the pH, Example No. 6, improved the ratio at 45° C. The best Co/Cr concentrations were also obtained at the lowest temperature or highest pH.

A measurement of acid addition ($H_2SO_4$) versus metal ion solubilization was also examined and is reported in Table VI for a separate example, No. 10. The conditions for Example No. 10 were those employed for Example No. 2, but 50 g of $-100+150$ mesh wet screened laterite was leached rather than dry screened.

TABLE VI

| | | Acid Addition During Leach Reaction | | | | | |
|---|---|---|---|---|---|---|---|
| Ex. No. | Time (min) | Conc. (ppm) Ni | Fe | Co | Mn | | $H_2SO_4$ (g) |
| 10 | 3 | 444 | 3000 | 294 | 762 | | 2.79 |
| | 30 | 642 | 12060 | 298 | 766 | | 19.77 |
| | 90 | 712 | 15640 | 290 | 748 | | 24.86 |

Separate analyses of the metal extraction data revealed that the addition of acid beyond a certain point, e.g., 20 g, would not increase the extraction of Ni but would contribute to further dissolution of Fe and Cr.

In order to determine the efficiency of the present process, more specifically when the $Cu^+ CH_3CN$ lixiviant is employed, a separate evaluation was conducted employing a two stage leaching.

A 50 gram sample of the laterite ore, $-100+150$ mesh dry screened, Example No. 11, was leached with the solution and under the conditions reported for Example No. 4 hereinabove for a total of 330 minutes. This solution was filtered and the leach residue collected. This residue was then subjected to a second leaching step, identical to the first for 90 minutes after which the remaining leach residue was filtered and washed. This second residue was then digested with aqua regia to determine metal values not leached.

The laterite feed material was similarly digested and analyzed following which a mass balance was then conducted and the results were used to calculate the percent recovery, or eventually solubilization for Ni, Co, Fe, Mn and Cr. The values were as follows: Ni 95.4%; Co 98.3%; Fe 97.2%; Mn 98.4%; and, Cr about 10 to 20%.

Leaching of Manganese ore with $Cu^+(CH_3CN)$

Having established the usefullness of the $Cu^+(CH_3CN)$ lixiviant with laterite ore, further evaluations were conducted to demonstrate the ability of this material to reduce manganese sea nodules.

The reactor employed was similar to the one discussed hereinabove in conjunction with the laterite leaching examples, except that it had a 500 ml capacity and improved, high speed stirrers. Pacific ocean manganese nodules, $-150+200$ mesh dry screened were employed and three exemplary experiments were conducted. Example No. 12 was a control or blank where no $Cu^+(CH_3CN)$ was employed. Examples No. 13 and 14 represent practice of the present invention.

EXAMPLE NO. 12

44.2 g of $CuSO_4$ were dissolved in 225 ml of $H_2O$ and the pH was adjusted to 2.0 by the addition of the same $H_2SO_4:H_2O$ mixture (50:50 vol). The solution was added to the glass reactor under $N_2$ purge and maintained at a constant 45° C. Then, 25 g of the manganese nodule was added with 100 ml $H_2O$. Stirring commenced at time zero and acid was provided on demand to maintain the pH at 2.0. 5 ml samples of solution were withdrawn at various times, diluted to 100 ml with $H_2O$/acid, filtered and analyzed by atomic absorption. After 90 minutes, the solution was filtered and 290 ml thereof were collected. Metal ion concentrations appear in Table VII with values for Examples No. 13 and 14.

EXAMPLE NO. 13

Utilizing the same reactor as for Example 12, 24 g of $CuSO_4$ were dissolved in 250 ml of $H_2O$ and the pH was adjusted to 2.0. The solution and 8.0 g of Cu metal were added to the reactor under $N_2$ purge. The reactants were vigorously stirred at 45° C. under refluxing conditions. Next, was added 48 ml of $CH_3CN$ with acid on demand to maintain pH and generate the cuprous lixiviant. Finally, 25.0 g of manganese nodules was added with 50 ml of $H_2O$ at time zero. 5 ml solution samples were again withdrawn at various times, diluted to 100 ml with $H_2O$/acid, filtered and analyzed. After 90 minutes, 415 ml of filtered solution remained.

EXAMPLE NO. 14

This procedure was conducted as the previous one except the addition of 25.0 g of nodules was with 25 ml of $H_2O$. Supply of $H_2SO_4:H_2O$ was not fast enough to maintain pH which did rise to 3.8 upon addition of the sea nodules. It was returned to 2.0 after 15 minutes although by then the reaction was substantially complete.

TABLE VII

| Redox Leaching of Manganese Sea Nodules with Cuprous Acetonitrile | | | | |
|---|---|---|---|---|
| | Time | Example No. | | |
| Element | (min) | 12 | 13 | 14 |
| Mn | 3 | 0.192 | 4.64 | 10.78 |
| g/l | 10 | 0.230 | — | 14.64 |
| | 15 | — | 10.5 | — |
| | 30 | 0.240 | — | 15.34 |
| | 60 | 0.258 | — | 15.36 |
| | 90 | 0.264 | 10.68 | 15.32 |
| Fe | 3 | 0.088 | 2.42 | 6.18 |
| g/l | 10 | 0.119 | — | 9.94 |
| | 15 | — | 5.98 | — |
| | 30 | 0.131 | — | 10.62 |
| | 60 | 0.142 | — | 10.96 |
| | 90 | 0.135 | 6.24 | 11.02 |
| Ni | 3 | 6.0 | 177.6 | 386 |
| ppm | 10 | 10.6 | — | 544 |
| | 15 | — | 412.0 | — |
| | 30 | 19.2 | — | 570 |
| | 60 | 29.4 | — | 566 |
| | 90 | 37.0 | 428.0 | 578 |
| Co | 3 | 1.2 | 29.6 | 64 |
| ppm | 10 | 1.4 | — | 80 |
| | 15 | — | 59.4 | — |
| | 30 | 1.4 | — | 81 |

TABLE VII-continued

Redox Leaching of Manganese Sea Nodules with Cuprous Acetonitrile

| Element | Time (min) | Example No. 12 | Example No. 13 | Example No. 14 |
|---|---|---|---|---|
| | 60 | 1.8 | — | 78 |
| | 90 | 2.2 | 60.0 | 79 |
| Co | 3 | 1.2 | 29.6 | 64 |
| ppm | 10 | 1.4 | — | 80 |
| | 15 | — | 59.4 | — |
| | 30 | 1.4 | — | 81 |
| | 60 | 1.8 | — | 78 |
| | 90 | 2.2 | 60.0 | 79 |

The leach residue from Example No. 14 was digested in aqua regia and the solution analyzed by atomic absorption. The Mn nodule feed material was also subjected to this digestion and analysis. Mass balance calculations showed the following percent solubilizations by weight: Mn 99.9; Fe 94.3; Ni 99.4; and, Co 99.6.

Leaching of Laterite with $Cu(CO)^+$ Acidic Solution

Two experiments were conducted and evaluated utilizing $Cu(CO)^+$ for the reduction of a laterite ore as follows:

EXAMPLE NO. 15

Into a one liter autoclave was charged 39.5 g $CuSO_4$, 5.24 g of copper powder and 550 ml of water. The mixture was purged with CO to remove air and the pH was adjusted to 1.5 using $H_2SO_4/H_2O$ (50:50 vol). The reaction was stirred at 45° C. under a CO pressure of 175 psig (1.21 MPa) for four hours in order to insure complete dissolution of the copper metal.

Next, 500 ml of the cuprous solution formed in the first autoclave (A) was transferred to a two liter autoclave (B) by pressure differential under CO. Autoclave B contained 25 g Gasquet mountain laterite, −270 mesh wet screened, at 45° C. and 75 psig (0.52 MPa) CO. When the transfer of solution from autoclave A to B was completed, stirring in B commenced as did leaching of the laterite and time zero was established. Total CO pressure during leaching was maintained at 1.21 MPa and the acid/water solution was added on demand to maintain pH at 1.5. The pH probe monitoring device failed after 30 minutes and therefore acid addition was discontinued. At the end of the leaching, the contents of B were filtered. Solids content was 11.8 g wet; filtrate collected was 500 ml.

EXAMPLE NO. 16

The procedure followed was identical to that for Example No. 15 except that 20 g of Gasquet laterite was leached in Autoclave B. The pH probe functioned properly and total acid/water addition on demand, 50:50 volume, was 11 g. The pH drifted from 1.5 to 1. over the total leaching time.

Metal ion concentrations were measured by withdrawing 5 ml solution samples from B. Each sample was quenched in $H_2O$ (acidic) containing a small amount of hydrogen peroxide and then diluted to 100 ml. Each solution was analyzed after filtration, by atomic absorption spectroscopy. The metal ion concentrations for Fe, Ni, Mn and Co at various times in minutes from time zero were measured and have been reported in Table VIII. Concentrations for Fe were g/l while for the other four metals ppm has been indicated.

TABLE VIII

Metal Ion Concentrations Following Laterite Leaching with $Cu(CO)^+$

| Ex. No. | Time (min) | Fe g/l | Ni ppm | Mn ppm | Co ppm | Cr ppm |
|---|---|---|---|---|---|---|
| 15 | 3 | 5.45 | 134 | 103 | 33 | 30 |
| | 10 | 9.52 | 251 | 164 | 57 | 56 |
| | 30 | 12.70 | 315 | 182 | 62 | 74 |
| | 60 | 19.14 | 364 | 234 | 79 | 109 |
| | 120 | 20.70 | 400 | 242 | 80 | 117 |
| 16 | 3 | 1.12 | 67 | 131 | 45 | 11 |
| | 10 | 1.84 | 101 | 175 | 64 | 13 |
| | 30 | 4.78 | 175 | 264 | 92 | 22 |
| | 60 | 6.46 | 214 | 192 | 65 | 31 |
| | 90 | 8.76 | 236 | 190 | 64 | 40 |
| | 120 | 11.18 | 314 | 212 | 73 | 49 |

Again, it can be observed that the leaching process produced large amounts of Fe and Ni, apparently less Mn and Co but nevertheless high values because laterites are low in these values and, little Cr.

Reduction of $Cu^{++}$ to $Cu^+(CO)$

As has been developed hereinabove, the process of the present invention employs cuprous solutions to leach laterites, manganese sea nodules and similar ores. These can be generated by any suitable means including those disclosed herein. At least one novel and preferred method for preparing the cuprous reductant is set forth herein and it involves the use of a quinone Q, as disclosed hereinabove.

General Procedure

In the examples which follow, the given anthraquinone AQ was first dissolved in a solvent mixture of polar and non-polar organic solvents. The ratio of each is optimized for the maximum solubility of both the anthraquinone and its corresponding anthraquinol and thus, neither the solvents nor the specific amounts should be construed as limiting.

The organic solvent mixture was introduced into a first autoclave followed by the addition of a hydrogenation catalyst such as 5% Pd on $Al_2O_3$. Air was displaced with an inert gas Ar, although He, $N_2$ and the like could be substituted. Pressure was increased to 125 psi (0.86 MPa) with stirring and heating to 50° C. Hydrogen gas was introduced to a total pressure of 175 psi (1.21 MPa) and was maintained by periodic addition.

The desired volume of reduced organic material was transferred from the first autoclave to a second under pressure. The liquid organic was transferred from the first autoclave through a dip tube equipped with a filtering element in order to retain the hydrogenation catalyst. The second autoclave contained an aqueous acidic cupric sulfate solution at a given pH, temperature, copper concentration and volume and under a CO pressure. Time zero for the reaction commenced with stirring of the transferred organic and aqueous solution with CO gas.

5 cc samples of aqueous phase were taken at time intervals indicated in Table IX. These were then oxidized with an acidic $FeCl_3$ (1M) 25 ml solution which was titrated with a cerric ammonium sulfate solution to determine ferrous ion. From this, the concentration of cuprous (generated) versus time in the autoclave was calculated and the total copper concentration was determined by atomic absorption spectroscopy.

EXAMPLE NO. 17

Organic (Autoclave 1)
  60% vol xylene
  40% vol 2-ethyl-1-hexanol
  49 g/l 2-ethyl anthraquinone
    550 ml of organic reduced with $H_2$ over
    5% Pd (1 g) on $Al_2O_3$ in autoclave 1 at 50° C.
    472 ml of organic transferred to autoclave 2
Aqueous (Autoclave 2)
  125 ml $CuSO_4$ solution, [Cu]=75.0 g/l
  pH=2.0
  T=50° C.
  125 psig CO (0.86 MPa)
After transfer of the organic, the total pressure was increased to 225 psig (1.55 MPa) with CO and maintained.

EXAMPLE NO. 18

Organic Same as for No. 17, except 500 ml transferred to autoclave 2.
Aqueous Same as for No. 17, except CO pressure was maintained at 150 psig (1.04 MPa).

EXAMPLE NO. 19

Organic (Autoclave 1)
  3000 ml xylene
  1000 ml isobutyl-heptyl-ketone
  220 g 2-t-butyl-anthraquinone
    550 ml of organic reduced as in Example No. 17
    485 ml of organic transferred to autoclave 2
Aqueous (Autoclave 2)
  250 ml $CuSO_4$ solution, [Cu]=48.6 g/l
  pH=2.0
  T=50° C.
  50 psig CO (0.35 MPa)
After transfer of the organic, total pressure was increased to 150 psig (1.04 MPa) with CO.

EXAMPLE NO. 20

Organic Same as for No. 19, except 495 ml transferred to autoclave 2.
Aqueous Same as for No. 19, except 167 ml volume of $CuSO_4$.

EXAMPLE NO. 21

Organic Same as for No. 19, except 495 ml transferred to autoclave 2.
Aqueous Same as for No. 19, except 125 ml volume of $CuSO_4$.

EXAMPLE NO. 22

Organic Same as for No. 20, except 495 ml transferred to autoclave 2.
Aqueous Same as for No. 19 Total CO pressure, 225 psig (1.55 MPa).

EXAMPLE NO. 23

Organic Same as for No. 19 except 500 ml transferred to autoclave 2.
Aqueous Same as for No. 19 except 167 ml volume of $CuSO_4$.
Total CO pressure, 225 psig (1.55 MPa). At the end of the reduction, the aqueous solution was colorless indicating almost total reduction to $Cu^+$.

TABLE IX

| Time (min) | $Cu^+$ Concentration (g/l) versus time Example Nos. | | | | | | |
|---|---|---|---|---|---|---|---|
| | 17 | 18 | 19 | 20 | 21 | 22 | 23 |
| 2 | 11.3 | 10.7 | 3.8 | 8.2 | 15.3 | 7.3 | 20.3 |
| 10 | 26.4 | 27.0 | 9.5 | 15.1 | 30.8 | 19.4 | 34.6 |
| 20 | 39.4 | 42.9 | 17.8 | 20.8 | 49.9 | 35.4 | 50.8 |
| 40 | 51.8 | 62.8 | 27.9 | 22.1 | 49.7 | 38.7 | 50.2 |

As can be seen from Table IX, the highest cuprous concentrations were observed for Examples 17, 18, 21 and 23 with acceptable concentrations occurring after only 20 minutes.

Selective leaching of Co, Ni and Mn from Laterite with $Fe^{2+}/Cu^{2+}$ acid solution As stated hereinabove, the pregnant liquor from the first step of the ARIS process for the leaching of laterites contains reduced iron $Fe^{2+}$ and oxidized copper $Cu^{2+}$. This material could be employed to reduce manganese from a fresh supply of ore which also results in the dissolution of cobalt. In the work which is discussed next, two experiments were conducted to demonstrate the use of this reductant solution. The first, Example No. 24 constitutes a control or blank with $Cu^{2+}$ and $H_2SO_4$ but no $Fe^{2+}$. The second example, No. 25, employed $Cu^{2+}$, $H_2SO_4$ and $Fe^{2+}$ which was added to simulate the pregnant liquor from the first step of the ARIS process.

The following ingredients were dissolved, stirred and heated in a 500 ml jacketed glass reactor at 45° C. with the necessary addition of $H_2SO_4$ to maintain a pH of 2.0. Example No. 24: 341 ml $H_2O$ plus 70.3 g $CuSO_4$; Example No. 25: 341 ml $H_2O$ plus 70.3 g $CuSO_4$ plus 61.3 g $FeSO_4$.

At time zero, 50 g of Gasquet laterite, −270 mesh wet screened plus 100 ml of $H_2O$ were added to each reactor. Samples were taken and analyzed as previously described and have been reported in Table X all concentrations being ppm.

TABLE X

| Leaching with $Fe^{2+}/Cu^{2+}$ Acid Solutions | | | |
|---|---|---|---|
| Element | Time (min) | Example No. 24 | Example No. 25 |
| Co | 3 | 12.40 | 154.00 |
| | 20 | 13.60 | 144.00 |
| | 60 | 17.60 | 156.00 |
| | 120 | 22.20 | 146.00 |
| Mn | 3 | 37.20 | 486.00 |
| | 20 | 40.00 | 482.00 |
| | 60 | 47.40 | 498.00 |
| | 120 | 58.00 | 492.00 |
| Ni | 3 | 50.40 | 188.0 |
| | 20 | 66.00 | 220.00 |
| | 60 | 99.00 | 248.00 |
| | 120 | 133.80 | 260.00 |

Clearly, the $Fe^{2+}$ ions accessed greater concentrations of Co, Mn and Ni than occurred where they were not employed.

In conclusion, it should be apparent that those processes disclosed herein for redox leaching are highly effective in selectively extracting useful metals such as nickel and cobalt, as well as iron and manganese, and copper when present, from lateritic ores and manganese ores, both terrestrial and sea nodules. Not only are these metals extracted in nearly quantitative yields but the processes operate at low temperature and pressures and without incurring the expense of costly reagents or reagents that cannot be regenerated inexpensively.

Insofar as the latter regeneration is considered, those processes that have been disclosed herein can be characterized by fast, clean, relatively inexpensive steps utilizing only $H_2$, CO or syngas and without elaborate processing or producing deleterious by-products. It should also be evident that, if desired, another useful feature of the present invention is that it provides processes whereby chromium and certain precious metals, contained in the ores treated can now be extracted inasmuch as the various processes do not access these metals to any significant extent, in effect, concentrating the content in the solid ore residue from whence two or three times the original percentage per unit weight is provided.

Thus, it should be apparent to those skilled in the art that the ARIS processes and those modifications and adjuncts set forth herein are operable on a variety of ore feeds, in various combinations, described or otherwise disclosed, and within various processing parameters. The present processes should not be limited by known methods of final separations of the metal ions extracted in the pregnant liquor, i.e., $Fe^{2+}$, $Mn^{2+}$, $Ni^{2+}$ and $Co^{2+}$ or by their point of removal and these can readily be designed into an overall system in consideration of existing equipment and/or the by-products desired by the operator.

Furthermore, it is to be understood that all of the variables, those disclosed as well as those falling within the existing skill in the art, fall within the scope of the claimed invention and that the subject invention is in no way limited by the examples and respective tables set forth herein. These have been provided merely to provide a demonstration of operability and, therefore, the selection of ores, reactants, processing steps and parameters and the like can readily be determined without departing from the spirit of the invention herein disclosed and described. Moreover, the scope of the invention shall include all modifications and variations that fall within the scope of the attached claims.

I claim:

1. A process for the extraction of ferrous, manganous and nonferrous metals from iron oxide and manganese oxide containing ores by reduction leaching comprising the steps of:
   contacting the pulverized ore with a stabilized acidic cuprous ion solution $Cu+L$ in a suitable reactor at a temperature of up to about 90° C. while maintaining the pH between about 1.5 and 2.5 with acid to form a slurry, wherein L is a stabilizing ligand selected from the group consisting of CO, XRCN and $Cl^-$, X being —H or —OH and R being aliphatic having from one to about four carbon atoms;
   separating said slurry into a solid tailings portion and a pregnant liquor, said pregnant liquor containing solubilized ferrous, manganous, cupric and other nonferrous metal ions;
   selectively extracting said solubilized metal ions; and
   regenerating said cuprous ion solution from said solubilized cupric ions and said ligand, L in the presence of a reductant.

2. A process, as set forth in claim 1, wherein said contacting step is conducted at low pressure ranging from about ambient to about 1.5 MPa and at a temperature of from about 20° to 90° C.;
   wherein said pH is about 2 and,
   wherein said acid is sulfuric.

3. A process, as set forth in claim 1, wherein said iron oxide ore comprises laterite and said manganese oxide ore comprises manganese sea nodules and terrestrial manganese ore.

4. A process, as set forth in claim 1, wherein said ferrous metal is iron, said manganous metal is manganese and said nonferrous metals comprise at least one member of the group consisting of nickel, cobalt and copper.

5. A process, as set forth in claim 4, wherein said iron and manganese metals are separated before said nickel, cobalt and copper metals.

6. A process, as set forth in claim 5, wherein said nickel and cobalt metals are separated before said step of regenerating said cuprous ion solution.

7. A process, as set forth in claim 5, wherein said nickel and cobalt metals are separated after said step of regenerating said cuprous ion solution.

8. A process, as set forth in claim 4, wherein said iron, manganese, nickel and cobalt metals are separated after said step of regenerating said cuprous ion solution.

9. A process, as set forth in claim 1, wherein said tailings are essentially free of iron, manganese, nickel, cobalt and copper metals and are enriched in chromium and any precious metals other than silver contained in said ore.

10. A process, as set forth in claim 1, wherein L is CO and said step of regenerating includes the steps of:
   combining said solubilized cupric ions with CO and a quinolic compound selected from the group consisting of quinol, anthraquinols and naphthoquinols at a pressure of from about 0.1 to about 1.5 MPa and at a temperature of from about 20° to 90° C. to form an aqueous $CuCO^+$ lixiviant and the corresponding quinonic compound;
   separating said lixiviant from said quinonic compound; and
   regenerating said quinolic compound from said quinonic.

11. A process, as set forth in claim 10, wherein said step of regenerating said quinolic compound is conducted with hydrogen gas over a suitable catalyst at a pressure of from about 0.1 to about 1.2 MPa and a temperature of from about 20° to about 80° C.

12. A process, as set forth in claim 1, wherein L is XRCN and said step of regenerating includes the steps of:
   combining said solubilized cupric ions with XRCN and a quinolic compound selected from the group consisting of quinol, anthraquinols and naphthoquinols at a pressure of from about 0.1 to about 1.0 MPa and at a temperature of from about 20° to 90° C. to form a CuXRCN lixiviant and the corresponding quinonic compound;
   separating said lixiviant from said quinonic compound; and
   regenerating said quinolic compound from said quinonic.

13. A process, as set forth in claim 12, wherein L is $CH_3CN$.

14. A process, as set forth in claim 13, wherein said step of regenerating said quinolic compound is conducted with hydrogen gas over a suitable catalyst at a pressure of from about 0.1 to about 1.2 MPa and a temperature of from about 20° to about 80° C.

15. A process, as set forth in claim 1, wherein said step of regenerating includes the steps of:

dividing said cupric ion solution into first and second streams;

combining said first stream with a quinolic compound selected from the group consisting of quinol and anthraquinols to form a three phase slurry consisting essentially of free copper metal, an aqueous acid phase and the corresponding quinonic compound;

separating said quinonic compound from said copper metal and aqueous acid; and combining said second stream with said copper metal and aqueous acid and with said ligand L, where L is CO or XRCN, whereby the stabilized cuprous ion solution, Cu+L is formed.

16. A process, as set forth in claim 15, wherein L is CO and said second step of combining is conducted at a pressure of from about 0.1 to about 1.5 MPa and at a temperature of from about 20° to about 90° C.

17. A process, as set forth in claim 15, wherein L is XRCN and said second step of combining is conducted at a pressure of from about 0.1 to about 1.0 MPa and at a temperature of from about 20° to about 90° C.

18. A process, as set forth in claim 17, wherein L is $CH_3CN$.

19. A process, as set forth in claim 15, including the additional step of regenerating said quinolic compound from said quinonic.

20. A process, as set forth in claim 19, wherein said step of regenerating said quinolic compound is conducted with hydrogen gas over a suitable catalyst at a pressure of from about 0.1 to about 1.2 MPa and a temperature of from about 20° to about 80° C.

21. A process, as set forth in claim 1, wherein said step of regenerating includes the steps of:

reducing said solubilized cupric ions with hydrogen to form a slurry comprising copper metal, cupric ions and acid; and cooling and combining said slurry with said ligand L, where L is CO or XRCN, to form the stabilized ion solution Cu+L.

22. A process, as set forth in claim 21, wherein said step of reducing is conducted in an autoclave operating at a pressure of between about 1.5 and 5.0 and at a temperature of from about 200° to 280° C.

23. A process, as set forth in claim 22, wherein said slurry is cooled to at least about 140° C. and L is CO.

24. A process, as set forth in claim 22, wherein said slurry is cooled to at least about 90° C. and L is $CH_3CN$.

25. A process, as set forth in claim 1, wherein said step of regenerating includes the steps of:

reducing said solubilized cupric ions with CO to form a slurry comprising copper metal, cupric ions and acid; and cooling and combining said slurry with said ligand L, where L is CO or XRCN, to form the stabilized ion solution Cu+L.

26. A process, as set forth in claim 25, wherein said step of reducing is conducted in an autoclave operating at a pressure of between about 1.5 and 5.0 MPa and at a temperature of from about 150° to 260° C.

27. A process, as set forth in claim 26, wherein said slurry is cooled to at least about 140° C. and L is CO.

28. A process, as set forth in claim 26, wherein said slurry is cooled to at least about 90° C. and L is $CH_3CN$.

29. A process, as set forth in claim 1, wherein said step of regenerating includes the steps of:

reducing said solubilized cupric ions with syngas to form a slurry comprising copper metal, cupric ions, cuprous ions and acid; and cooling and combining said slurry with said ligand L, where L is CO or XRCN, to form the stabilized ion solution Cu+L.

30. A process, as set forth in claim 29, wherein said step of reducing is conducted in an autoclave operating at a pressure of between about 1.5 and 5.0 MPa and at a temperature of from about 150° to 280° C.

31. A process, as set forth in claim 1, including the additional step of:

removing a portion of said cuprous ions from said cuprous ion solution after said step of regenerating.

32. A process, as set forth in claim 31, wherein said step of removing includes the steps of:

drawing off a slipstream of said stabilized cuprous ion solution;

allowing said slipstream to disproportionate, forming free copper metal and cupric ions; and separating said copper metal from said cupric ions.

33. A process, as set forth in claim 32, wherein said cupric ions are combined with said stabilized cuprous ion solution.

34. A process, as set forth in claim 1, including the additional step of:

removing a portion of said copper ions from said copper ion solution before said step of regenerating.

35. A process, as set forth in claim 34, wherein said step of removing includes the steps of:

combining said solubilized cupric ions with a quinolic compound selected from the group consisting of quinol and anthraquinols to form a three phase slurry consisting essentially of free copper metal, an aqueous acid phase and the corresponding quinonic compound; and separating said copper metal therefrom.

36. A process, as set forth in claim 1, including the additional step of:

recycling said regenerated cuprous ion solution to said reactor.

37. A process for the extraction of ferrous, manganous and nonferrous metals from iron oxide and manganese oxide containing ores by reduction leaching comprising the steps of:

contacting the pulverized ore with a stabilized acidic cuprous ion solution Cu+L at a temperature of up to about 90° C. while maintaining the pH between about 1.5 and 2.5 with acid to form a slurry, wherein L is a stabilizing ligand selected from the group consisting of CO, XRCN and $Cl^-$, X being —H or —OH and R being aliphatic having from one to about four carbon atoms;

separating said slurry into a solid tailings portion and a pregnant liquor, said pregnant liquor containing solubilized ferrous, manganous, cupric and other nonferrous metal ions; and selectively extracting said solubilized metal ions.

38. A process, as set forth in claim 37, wherein said contacting step is conducted at low pressure ranging from about ambient to about 1.5 MPa and at a temperature of from about 20° to 90° C.;

wherein said pH is about 2 and, wherein said acid is sulfuric.

39. A process, as set forth in claim 37, wherein said iron oxide ore comprises laterite and said manganese oxide ore comprises manganese sea nodules and terrestrial manganese ore.

40. A process, as set forth in claim 37, wherein said ferrous metal is iron, said manganous metal is manganese and said nonferrous metals comprise at least one member of the group consisting of nickel, cobalt and copper.

41. A process, as set forth in claim 40, wherein said iron and manganese metals are separated before said nickel, cobalt and copper metals.

42. A process, as set forth in claim 37, wherein said tailings are essentially free of iron, manganese, nickel, cobalt and copper metals and are enriched in chromium and any precious metals other than silver contained in said ore.

43. A process for the regeneration of stabilized cuprous ion solutions, usable as reductants, from acidic cupric ion solutions comprising the steps of:
    combining said solubilized cupric ions with CO as a stabilizing ligand and a quinolic compound selected from the group consisting of quinol, anthraquinols and naphthoquinols at a pressure of from about 0.1 to about 1.5 MPa and at a temperature of from about 20° to 90° C. to form an aqueous $CuCO^+$ lixiviant and the corresponding quinonic compound;
    separating said lixiviant from said quinonic compound; and
    regenerating said quinolic compound from said quinonic.

44. A process, as set forth in claim 43, wherein said step of regenerating said quinolic compound is conducted with hydrogen gas over a suitable catalyst at a pressure of from about 0.1 to about 1.2 MPa and a temperature of from about 20° to about 80° C.

45. A process for the regeneration of stabilized cuprous ion solutions, usable as reductants, from acidic cupric ion solutions comprising the steps of:
    dividing said cupric ion solution into first and second streams;
    combining said first stream with a quinolic compound selected from the group consisting of quinol and anthraquinols to form a three phase slurry consisting essentially of free copper metal, an aqueous acid phase and the corresponding quinonic compound;
    separating said quinonic compound from said copper metal and aqueous acid; and
    combining said second stream with said copper metal and aqueous acid and with a stabilizing ligand L, where L is CO or XRCN, whereby the stabilized cuprous ion solution, $Cu+L$ is formed.

46. A process, as set forth in claim 45, wherein L is CO and said second step of combining is conducted at a pressure of from about 0.1 to about 1.5 MPa and at a temperature of from about 20° to about 90° C.

47. A process, as set forth in claim 45, wherein L is XRCN and said second step of combining is conducted at a total pressure of from about 0.1 to about 1.0 MPa and at a temperature of from about 20° to about 90° C.

48. A process for the regeneration of stabilized cuprous ion solutions, usable as reductants, from acidic cupric ion solutions comprising the steps of:
    reducing said solubilized cupric ions with CO to form a slurry comprising copper metal, cupric ions and acid; and
    cooling and combining said slurry with a stabilizing ligand L, where L is CO or XRCN, to form the stabilized ion solution $Cu+L$.

49. A process, as set forth in claim 48, wherein said step of reducing is conducted in an autoclave operating at a pressure of between about 1.5 and 5.0 MPa and at a temperature of from about 200° to 280° C.

50. A process, as set forth in claim 48, including the additional step of cooling said slurry to a temperature of at least about 140° C. prior to said step of combining.

51. A process for the regeneration of stabilized cuprous ion solutions, usable as reductants, from acidic cupric ion solutions comprising the steps of:
    reducing said solubilized cupric ions with syngas in an autoclave operating at a pressure of between about 1.5 and 5.0 MPa and at a temperature of from about 150° to 280° C. to form a slurry comprising copper metal, cupric ions, cuprous ions and acid; and
    cooling and combining said slurry with a stabilizing ligand L, where L is CO or XRCN, to form the stabilized ion solution $Cu+L$.

52. A process for the extraction of ferrous, manganous and nonferrous metals from iron oxide and manganese oxide containing ores by reduction leaching comprising the steps of:
    contacting the pulverized ore with a stabilized acidic cuprous ion solution $Cu+L$ at a temperature of up to about 90° C. while maintaining the pH between about 1.5 and 2.5 with acid to form a slurry, wherein L is a stabilizing ligand selected from the group consisting of CO, XRCN and $Cl^-$, X being —H or —OH and R being aliphatic having from one to about four carbon atoms;
    separating said slurry into a solid tailings portion and a pregnant liquor, said pregnant liquor containing solubilized ferrous, manganous, cupric and other nonferrous metal ions;
    feeding said pregnant liquor to a second pulverized ore feed containing, at least partially, manganese oxide containing ore to form a second slurry;
    separating said second slurry into a solid tailings portion containing substantially unsolubilized iron oxide ore and a second pregnant liquor containing solubilized ferric, manganous, cupric and other nonferrous ions; and
    selectively extracting said solubilized metal ions.

53. A process, as set forth in claim 52, wherein said iron oxide ore comprises laterite and said manganese oxide ore comprises manganese sea nodules and terrestrial manganese ore.

54. A process, as set forth in claim 52, wherein said ferrous metal is iron, said manganous metal is manganese and said nonferrous metals comprise at least one member of the group consisting of nickel, cobalt and copper.

55. A process, as set forth in claim 52, wherein said contacting step is conducted at low pressure ranging from about ambient to about 1.5 MPa and at a temperature of from about 20° to 90° C.;
    wherein said feeding step is conducted at low pressure ranging from about ambient to about 0.3 MPa and at a temperature of from about 20° to 90° C.;
    wherein said pH is about 2 and,
    wherein said acid is sulfuric.

56. A process, as set forth in claim 52, including the additional step of:

recycling said unsolubilized iron oxide to said reactor.

57. A process, as set forth in claim 52, including the additional steps of:

separating said cupric ions from the other solubilized divalent metal ions; and regenerating said cuprous ion solution from said solubilized cupric ions and said ligand, L in the presence of a reductant.

58. A process for the selective extraction of manganous and nonferrous metals from iron oxide containing ores by reduction leaching comprising the steps of:

contacting the pulverized ore with an acidic $Fe^{2+}$ solution in a suitable reaction at a temperature of up to about 90° C. while maintaining the pH between about 1.5 and 2.5 with acid to form a slurry;

separating said slurry into a solid tailings portion and a pregnant liquor, said pregnant liquor containing solubilized ferric, manganous, cupric and other nonferrous metal ions; and selectively extracting said solubilized metal ions.

59. A process, as set forth in claim 58, wherein said contacting step is conducted at low pressure ranging from about ambient to about 0.3 MPa and at a temperature of from about 20° to 90° C.;

wherein said pH is about 2 and, wherein said acid is sulfuric.

60. A process, as set forth in claim 59, including the additional steps of:

treating said solid tailings with a stabilized acidic cuprous ion solution Cu+L at a temperature of up to about 90° C. while maintaining the pH between about 1.5 and 2.5 with acid to form a slurry, wherein L is a stabilizing ligand selected from the group consisting of CO, XRCN and $Cl^-$, X being —H or —OH and R being aliphatic having from one to about four carbon atoms;

separating said slurry into a second solid tailings portion and a second pregnant liquor, said second pregnant liquor containing solubilized ferrous, cupric and other nonferrous metal ions; and selectively extracting said solubilized metal ions.

61. A process, as set forth in claim 60, wherein said treating step is conducted at low pressure ranging from about ambient to about 1.5 MPa and at a temperature of from about 20° to 90° C.

* * * * *